United States Patent
Lo et al.

(10) Patent No.: US 9,952,853 B2
(45) Date of Patent: Apr. 24, 2018

(54) METHODS FOR CROSS-MOUNTING DEVICES AND APPARATUS UTILIZING THE SAME

(71) Applicant: MediaTek Inc., Hsinchu (TW)

(72) Inventors: JenChieh Lo, Nantou County (TW); Ching-Chieh Wang, Yilan County (TW); Shu-Hsin Chang, Hsinchu (TW); Chun-Hsiung Hu, Hsinchu (TW); Yu-Cheng Chang, Chiayi (TW)

(73) Assignee: MEDIATEK INC., Hsin-Chu (TW)

( * ) Notice: Subject to any disclaimer, the term of this patent is extended or adjusted under 35 U.S.C. 154(b) by 16 days.

(21) Appl. No.: 14/997,353

(22) Filed: Jan. 15, 2016

(65) Prior Publication Data

US 2016/0132321 A1 May 12, 2016

Related U.S. Application Data

(60) Provisional application No. 62/114,252, filed on Feb. 10, 2015, provisional application No. 62/114,276, (Continued)

(51) Int. Cl.
| | |
|---|---|
| *G06F 9/44* | (2006.01) |
| *G06F 3/00* | (2006.01) |
| *G06F 13/00* | (2006.01) |
| *G06F 9/445* | (2006.01) |
| *H04L 29/08* | (2006.01) |

(52) U.S. Cl.
CPC ............ *G06F 8/65* (2013.01); *G06F 9/4411* (2013.01); *G06F 9/4415* (2013.01); *H04L 67/34* (2013.01)

(58) Field of Classification Search
CPC .......... G06F 8/65; G06F 8/665; G06F 13/385; G06F 13/102; G06F 21/57; G06F 9/4411; G06F 9/4415; G06F 9/4416; G06F 8/63; A61B 5/0022; A61B 5/02055; A61B 5/1118; H04L 67/34
See application file for complete search history.

(56) References Cited

U.S. PATENT DOCUMENTS

| | | | |
|---|---|---|---|
| 7,334,157 B1* | 2/2008 | Graf | G06F 8/63 714/13 |
| 7,395,541 B2* | 7/2008 | Shoji | G06F 9/4411 719/321 |

(Continued)

OTHER PUBLICATIONS

B. Saha, CIRUS: a scalable modular architecture for reusable drivers, Jun. 2011, 2 pages.*

(Continued)

*Primary Examiner* — Thuy Dao
(74) *Attorney, Agent, or Firm* — Han IP Corporation; Andy M. Han

(57) ABSTRACT

A technique, as well as select implementations thereof, pertaining to cross-mounting a device is described. The technique may involve an apparatus detecting a presence of a device not a part of the apparatus. The technique may also involve the apparatus performing an update in response to the detecting of the presence of the device. The technique may additionally involve the apparatus establishing a communication connection with the device. The technique may further involve the apparatus utilizing the device to perform one or more tasks.

17 Claims, 18 Drawing Sheets

Related U.S. Application Data filed on Feb. 10, 2015, provisional application No. 62/121,022, filed on Feb. 26, 2015.

(56) References Cited

U.S. PATENT DOCUMENTS

| | | | | |
|---|---|---|---|---|
| 8,074,231 | B2* | 12/2011 | Hunt | G06F 9/4411 719/321 |
| 8,181,186 | B1* | 5/2012 | Holcomb | G06F 9/4411 714/799 |
| 8,832,720 | B2* | 9/2014 | Paves | G06F 9/4411 719/321 |
| 8,856,723 | B2* | 10/2014 | Lam | G06F 8/63 709/220 |
| 9,268,552 | B1* | 2/2016 | Kiiskila | G06F 8/65 |
| 2003/0195951 | A1 | 10/2003 | Wittel, Jr. et al. | |
| 2005/0102462 | A1* | 5/2005 | Choi | G06F 3/023 710/313 |
| 2005/0216717 | A1* | 9/2005 | Wong | G06F 9/4413 713/1 |
| 2005/0257215 | A1* | 11/2005 | Denby | G06F 8/65 717/172 |
| 2006/0218388 | A1* | 9/2006 | Zur | G06F 9/4416 713/2 |
| 2007/0006205 | A1* | 1/2007 | Kennedy | G06F 8/63 717/168 |
| 2008/0071962 | A1 | 3/2008 | Yang et al. | |
| 2008/0127165 | A1 | 5/2008 | Mullis et al. | |
| 2008/0301671 | A1* | 12/2008 | Kim | G06F 8/65 717/173 |
| 2008/0320501 | A1 | 12/2008 | Li et al. | |
| 2009/0113416 | A1* | 4/2009 | Bealkowski | G06F 8/65 717/177 |
| 2014/0119765 | A1* | 5/2014 | Hosoda | G03G 15/5004 399/75 |
| 2015/0169484 | A1* | 6/2015 | Lu | G06F 13/385 710/14 |

OTHER PUBLICATIONS

Amani et al., Automatic verification of active device drivers, Jan. 2014, 13 pages.*

* cited by examiner

METHODS FOR CROSS-MOUNTING DEVICES AND APPARATUS UTILIZING THE SAME

CROSS REFERENCE TO RELATED PATENT APPLICATIONS

The present disclosure claims the priority benefit of U.S. Provisional Patent Application No. 62/114,252, filed on 10 Feb. 2015, U.S. Provisional Patent Application No. 62/114,276, filed on 10 Feb. 2015, and U.S. Provisional Patent Application No. 62/121,022, filed on 26 Feb. 2015, which are incorporated by reference in their entirety.

TECHNICAL FIELD

The present disclosure is generally related to hardware abstraction and, more particularly, to methods for cross-mounting devices and associated apparatuses.

BACKGROUND

Unless otherwise indicated herein, approaches described in this section are not prior art to the claims listed below and are not admitted to be prior art by inclusion in this section.

With technology playing an increasingly important part in our lives, there may be new kinds of problems that we can expect to face. For example, a user may be accustomed to making a video call using a smartphone equipped with a camera. Nonetheless, what if the user would like to make a video call using the big screen on a high-definition television (TV). As another example, a user may have a set-top box connected to a TV for watching streamed videos, but sometimes the user may desire to watch the streamed videos from the set-top box when lying in bed. In short, not all devices/apparatuses are equipped with all the peripheral hardware that a user may need. Presently, many applications fail to function in devices/apparatuses that are not equipped with one or more hardware components having the capability needed by the user.

SUMMARY

The following summary is illustrative only and is not intended to be limiting in any way. That is, the following summary is provided to introduce concepts, highlights, benefits and advantages of the novel and non-obvious techniques described herein. Select, not all, implementations are further described below in the detailed description. Thus, the following summary is not intended to identify essential features of the claimed subject matter, nor is it intended for use in determining the scope of the claimed subject matter.

Advantageously, implementations in accordance with the present disclosure enable a user to seamlessly connect a device/apparatus lacking one or more hardware capabilities to one or more remote hardware components, thereby allowing the device/apparatus to function as if the device/apparatus is equipped with the one or more remote hardware components. Moreover, according to the present disclosure, different devices/apparatuses may discover and connect to each other and, after establishing the connection, automatically generate one or more virtual devices.

In one example implementation, a method may involve a first apparatus detecting a presence of a first device not a part of the first apparatus. The method may also involve the first apparatus performing an update in response to the detecting of the presence of the first device.

In another example implementation, a method may involve a first apparatus detecting a presence of a first device not a part of the first apparatus. The method may also involve the first apparatus performing firmware update in response to the detecting.

In yet another example implementation, a method may involve a first apparatus detecting a presence of a first device not a part of the first apparatus. The method may also involve the first apparatus establishing a communication connection with the first device. The method may further involve the first apparatus utilizing the first device to perform one or more tasks.

In still another example implementation, an apparatus may include a connection module and a processing unit coupled to the connection module. The connection module may be configured to detect a presence of a remote device and establish a communication connection with the remote device. The processing unit may be configured to utilize the remote device to perform one or more tasks.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Overview

Figure 1:
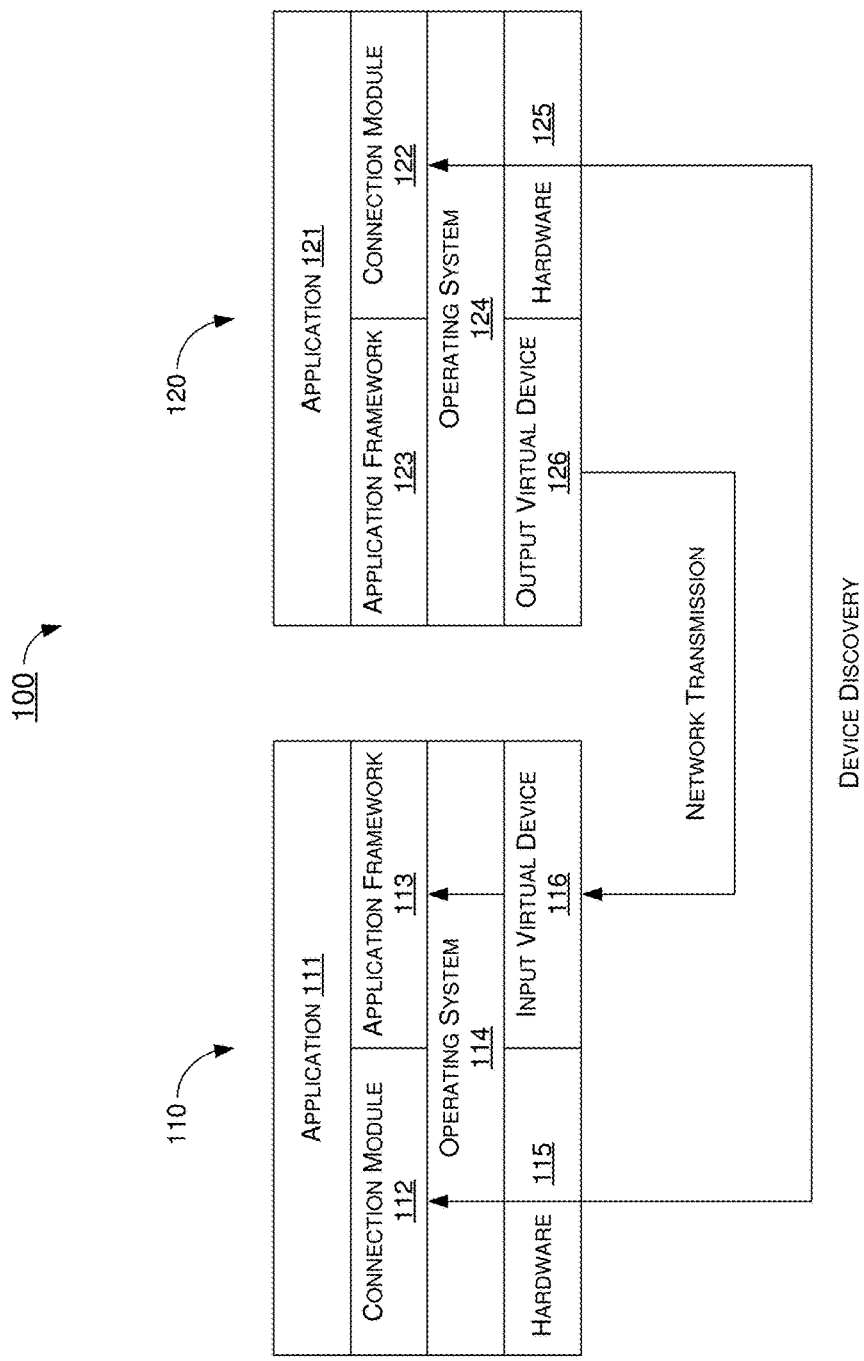
FIG. 1 is a diagram of an example scenario in accordance with an implementation of the present disclosure.

A novel cross-platform scheme or mechanism for cross-mounting hardware components such as peripheral devices is proposed herein. Under the proposed cross-platform scheme, various devices/apparatuses may be enabled to execute a given application without being limited by the hardware capability of the device/apparatus by seamlessly cross-mounting and utilizing hardware component(s) of one or more nearby devices/apparatuses. Accordingly, a user is not required to install any custom or specific application in order to utilize remote hardware component(s) and, thus, there is no learning curve for the user.

Implementations in accordance with the present disclosure enable a user to seamlessly connect a device/apparatus, which may lack one or more hardware capabilities, to one or more remote hardware components with the one or more hardware capabilities that the device/apparatus lacks. For instance, a smartphone, smartwatch and/or a tablet computer may be equipped with various peripheral hardware devices such as, for example, camera(s), microphone(s), gravity sensor(s), touch-sensing panel, speaker(s), touch identification (ID) sensor(s), display and the like. Through implementations in accordance with the present disclosure, a user may seamlessly connect devices/apparatuses, a TV for example, lacking one or more of the above-listed peripheral hardware devices hardware to such one or more peripheral devices of the smartphone or tablet computer so as to enable the device to utilize the peripheral devices of the smartphone or tablet computer.

According to the present disclosure, different devices/apparatuses may discover and connect to each other by a discovering protocol, e.g., the Universal Plug and Play (UPnP) protocol, another similar protocol or any suitable protocol. For instance, implementations in accordance with the present disclosure may utilize the UPnP technology which can run on many types of communication media that support Internet Protocol (IP) including, but not limited to, Ethernet, FireWire, Infrared (IR), home wiring (G.hn) and radio frequency (RF) such as, for example, Bluetooth and Wi-Fi. After establishing the connection, each of the devices/apparatuses may automatically generate, create, construct or otherwise establish one or more virtual devices therein. For instance, continuing with the above example, an input virtual device may be generated in a TV while an output virtual device may be generated in the smartphone or tablet computer. According to the present disclosure, virtual devices (including input virtual devices and output virtual devices) may be implemented in the form of software and/or firmware codes, which may be configured to, for example, emulate real hardware and handle interactions with an operating system (OS).

According to the present disclosure, an output virtual device may access data associated with a local physical hardware component (e.g., a peripheral device) for a corresponding remote input virtual device. For instance, an output virtual device may read data associated with the local physical hardware component and automatically transmit the data to one or more corresponding remote input virtual devices. Upon receiving the data from the output virtual device, an input virtual device may process, prepare or otherwise present the received data such that the received data resemble data output by a physical hardware component, so as to enable an apparatus (e.g., TV), in which the input virtual device is implemented, to provide functions/capabilities associated with the hardware component (e.g., camera on the smartphone) as if the apparatus is physically equipped with such hardware component. Advantageously, implementations in accordance with the present disclosure enable a device/apparatus to use various applications beyond the physical capabilities of the device/apparatus itself. That is, a device/apparatus in which a technique in accordance with the present disclosure is implemented may obtain and utilize remote hardware resources from other devices/apparatuses having such hardware resources.

Example Implementations

FIG. 1 illustrates an example scenario 100 in accordance with an implementation of the present disclosure. Scenario 100 may include a first apparatus 110 (e.g., a TV) and a second apparatus 120 (e.g., a smartphone or tablet computer). First apparatus 110 may be a device-demanding apparatus in that first apparatus 110 may be in need or in demand of one or more certain hardware capability/capabilities with which first apparatus 110 may not be equipped. Second apparatus 120 may be a device-providing apparatus in that second apparatus 120 may be equipped or otherwise associated with the one or more hardware capability/capabilities demanded by first apparatus 110 and, thus, in a position to provide or allow first apparatus 110 to utilize one or more hardware components of second apparatus 120 for such one or more hardware capability/capabilities. First apparatus 110 and second apparatus 120 may be physically separate from each other yet within a range of effective communication from each other, (e.g., via Near Field Communication, Bluetooth, Wi-Fi and/or cellular technologies such as Long Term Evolution and any existing and future wireless communication technologies). First apparatus 110 may include a number of components including at least those shown in FIG. 1 such as, for example, an application 111, a connection module 112, an application framework 113, an OS 114 and a hardware component 115. Likewise, second apparatus 120 may include a number of components including at least those shown in FIG. 1 such as, for example, an application 121, a connection module 122, an application framework 123, an OS 124 and a hardware component 125.

In scenario 100, each of first apparatus 110 and second apparatus 120 may detect or otherwise discover the presence of one another, e.g., via UPnP and/or any suitable technology or protocol, and establish a wired or wireless communication connection therebetween. For instance, connection module 112 of first apparatus 110 and connection module 122 of second apparatus 120 may perform the detection/discovery as well as establishment of a communication connection between themselves. Subsequently, first apparatus 110 may automatically set up, generate, create, construct or otherwise establish an input virtual device 116 and, correspondingly, second apparatus 120 may automatically set up, generate, create, construct or otherwise establish an output virtual device 126. Output virtual device 126 may access data from local physical hardware (e.g., hardware component 125) for the corresponding input virtual device 116. For instance, output virtual device 126 may read data from hardware component 125 and transmit the read data to input virtual device 116. Upon receiving the data from output virtual device 126, input virtual device 116 may process, prepare or otherwise present the received data to application framework 113 such that the received data resemble data output by a physical and local hardware component (e.g., hardware component 115). Application 111 may then utilize remote hardware component 125 as its own hardware component. This enables first apparatus 110 to perform one or more tasks by utilizing functions/capabilities associated with remote hardware component 125 (e.g., camera on the smartphone) as if first apparatus 110 is physically equipped with remote hardware component 125.

Figure 2:
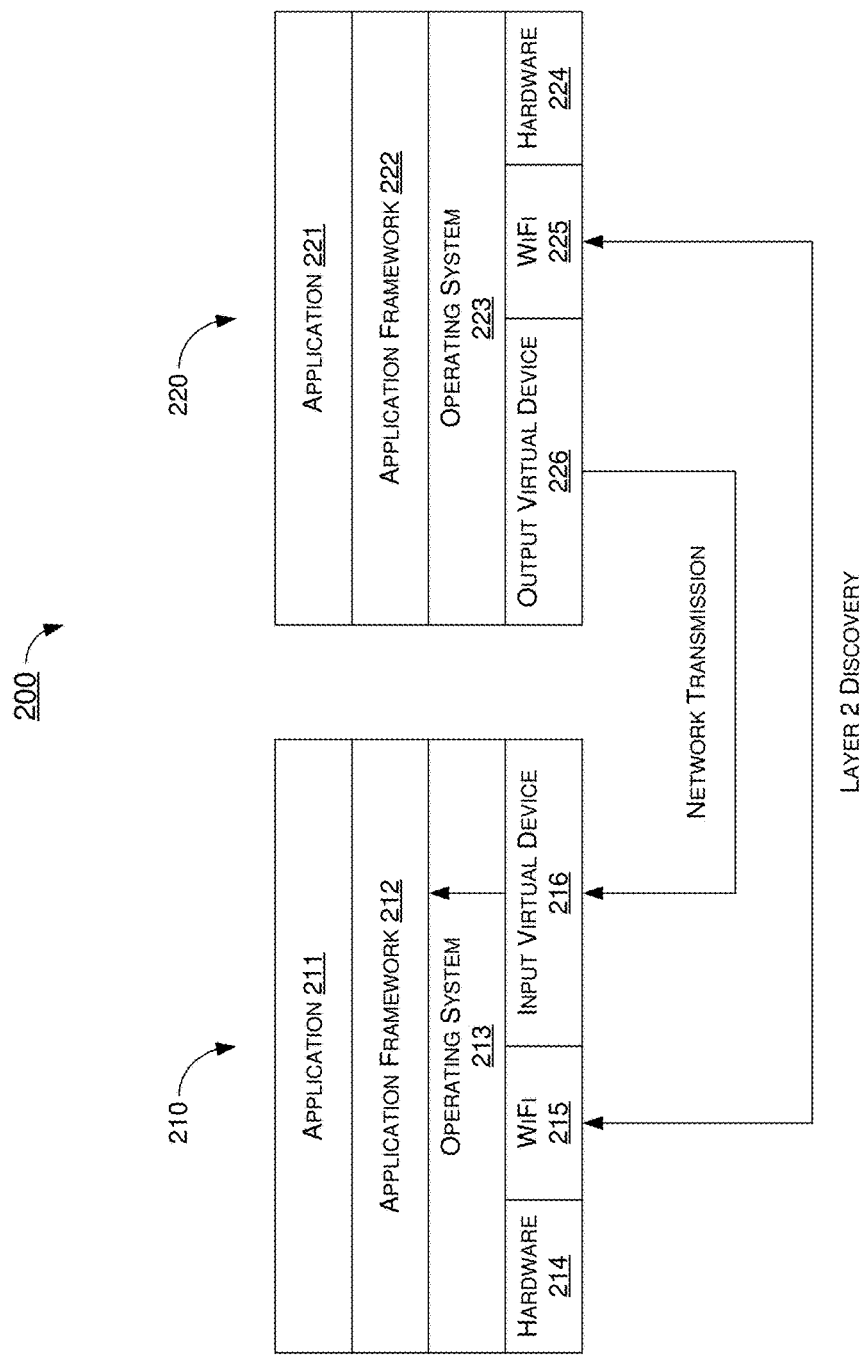
FIG. 2 is a diagram of an example scenario in accordance with another implementation of the present disclosure.

FIG. 2 illustrates an example scenario 200 in accordance with another implementation of the present disclosure. Scenario 200 may include a first apparatus 210 (e.g., a TV) and a second apparatus 220 (e.g., a smartphone or tablet computer). First apparatus 210 may be a device-demanding apparatus in that first apparatus 210 may be in need or in demand of one or more certain hardware capability/capabilities with which first apparatus 210 may not be equipped. Second apparatus 220 may be a device-providing apparatus in that second apparatus 220 may be equipped or otherwise associated with the one or more hardware capability/capabilities demanded by first apparatus 210 and, thus, in a position to provide or allow first apparatus 210 to utilize one or more hardware components of second apparatus 220 for such one or more hardware capability/capabilities. First apparatus 210 and second apparatus 220 may be physically separate from each other yet within a range of effective communication from each other. First apparatus 210 may include a number of components including at least those shown in FIG. 2 such as, for example, an application 211, an application framework 212, an OS 213, a hardware component 214 and a Wi-Fi module 215. Likewise, second apparatus 220 may include a number of components including at least those shown in FIG. 2 such as, for example, an application 221, an application framework 222, an OS 223, a hardware component 224 and a Wi-Fi module 225.

In scenario 200, each of first apparatus 210 and second apparatus 220 may detect or otherwise discover the presence of one another, e.g., via UPnP and/or any suitable technology or protocol, and establish a wired or wireless communication connection therebetween. For instance, Wi-Fi module 215 of first apparatus 210 and Wi-Fi module 225 of second apparatus 220 may perform the detection/discovery as well as establishment of a layer 2 (e.g., Wi-Fi) communication connection between themselves. Subsequently, first apparatus 210 may automatically set up, generate, create, construct or otherwise establish an input virtual device 216 and, correspondingly, second apparatus 220 may automatically set up, generate, create, construct or otherwise establish an output virtual device 226. Output virtual device 226 may access data from local physical hardware (e.g., hardware component 224) for the corresponding input virtual device 216. For instance, output virtual device 226 may read data from hardware component 224 and transmit the read data to input virtual device 216. Upon receiving the data from output virtual device 226, input virtual device 216 may process, prepare or otherwise present the received data to application framework 212 such that the received data resemble data output by a physical and local hardware component (e.g., hardware component 214). Application 211 may then utilize remote hardware component 224 as its own hardware component. This enables first apparatus 210 to perform one or more tasks by utilizing functions/capabilities associated with remote hardware component 224 (e.g., camera on the smartphone) as if first apparatus 210 is physically equipped with remote hardware component 224.

Figure 3:
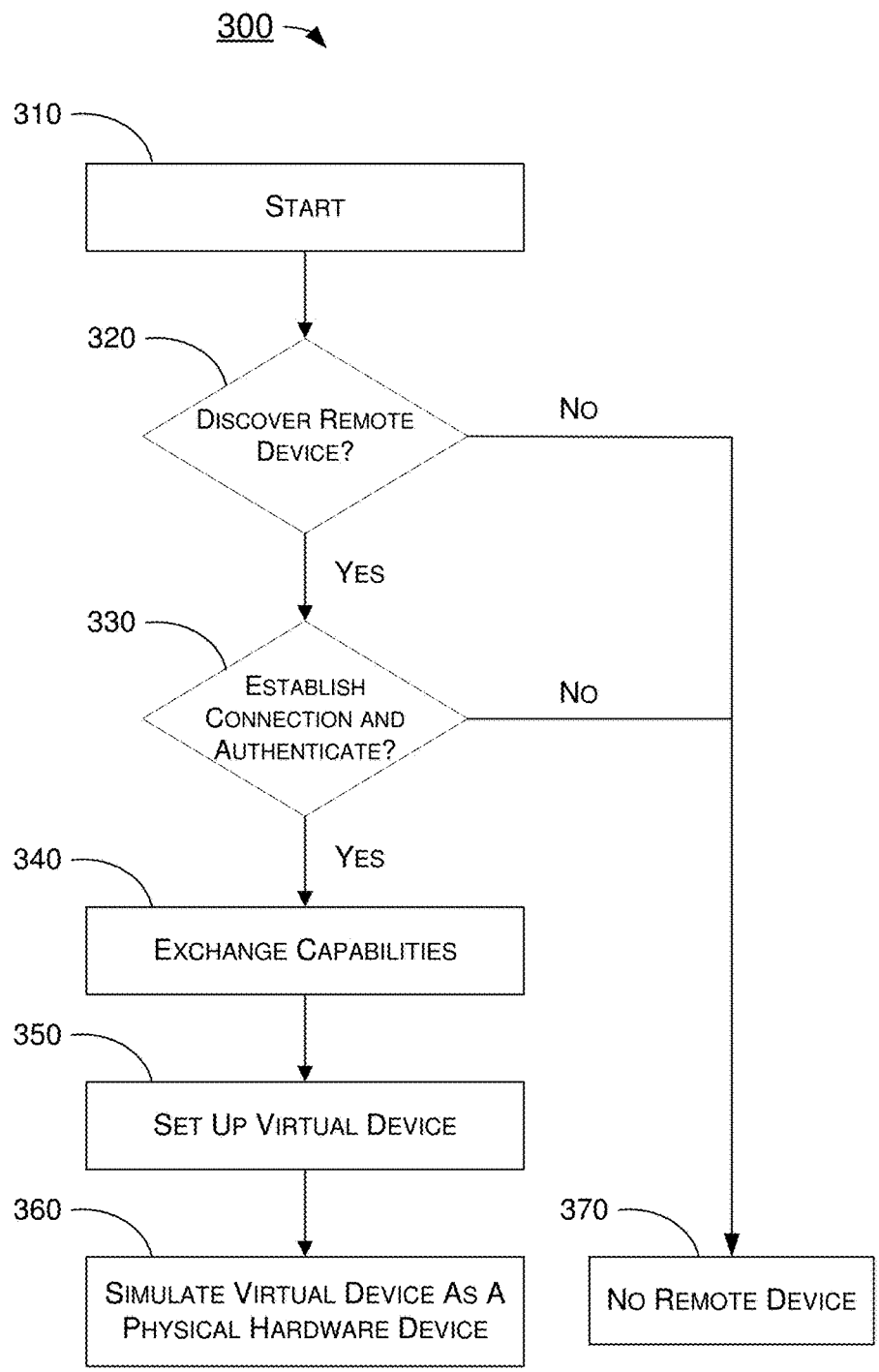
FIG. 3 is a diagram of an example algorithm in accordance with an implementation of the present disclosure.

FIG. 3 illustrates an example algorithm 300 in accordance with an implementation of the present disclosure. Algorithm 300 may include one or more operations, actions, or functions as represented by one or more blocks such as blocks 310, 320, 330, 340, 350, 360 and 370. Although illustrated as discrete blocks, various blocks of algorithm 300 may be divided into additional blocks, combined into fewer blocks, or eliminated, depending on the desired implementation. Algorithm 300 may be implemented in each of apparatus 110, apparatus 120, apparatus 210 and apparatus 220 described above as well as apparatus 600 and apparatus 700 described below.

Algorithm 300 may start at 310 and proceed to 320. At 320, algorithm 300 may involve an apparatus (e.g., apparatus 110, apparatus 120, apparatus 210 or apparatus 220) determining whether a remote device is discovered. In an event that no remote device is discovered, algorithm 300 may proceed from 320 to 370 as there is no remote device. In an event that a remote device is discovered, algorithm 300 may proceed from 320 to 330.

At 330, algorithm 300 may involve the apparatus determining whether a communication connection is established with the remote device and whether the remote device is authenticated. In an event that no communication connection is established with the remote device or that the remote device is not authenticated, algorithm 300 may proceed from 330 to 370 and consider there is no remote device available. In an event that a communication connection with the remote device is established and that the remote device is authenticated, algorithm 300 may proceed from 330 to 340.

At 340, algorithm 300 may involve the apparatus exchanging capabilities with the remote device so that each of the apparatus and the remote device is aware of the capabilities of each other. Algorithm 300 may proceed from 340 to 350.

At 350, algorithm 300 may involve the apparatus setting up a virtual device. For instance, the apparatus may establish an input virtual device or an output virtual device, depending on whether the apparatus is demanding or providing one or more hardware capabilities. Algorithm 300 may proceed from 350 to 360.

At 360, algorithm 300 may involve the apparatus simulating the virtual device as a physical hardware device. For instance, the apparatus may simulate an input virtual device as a physical hardware device, with the remote device providing one or more hardware capabilities.

Figure 4:
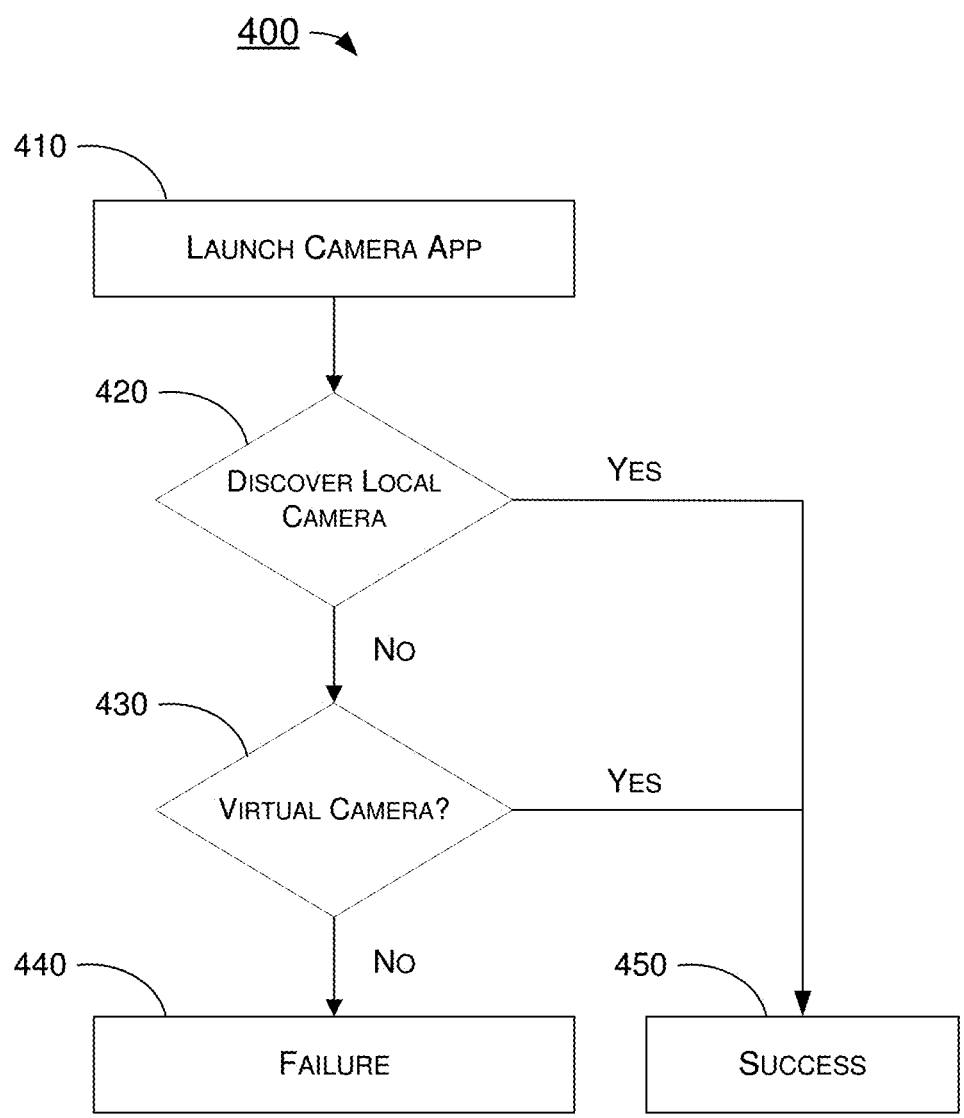
FIG. 4 is a diagram of an example algorithm in accordance with another implementation of the present disclosure.

FIG. 4 illustrates an example algorithm 400 in accordance with another implementation of the present disclosure. Algorithm 400 may include one or more operations, actions, or functions as represented by one or more blocks such as blocks 410, 420, 430, 440 and 450. Although illustrated as discrete blocks, various blocks of algorithm 300 may be divided into additional blocks, combined into fewer blocks, or eliminated, depending on the desired implementation. Algorithm 400 may be implemented in each of apparatus 110, apparatus 120, apparatus 210 and apparatus 220 described above as well as apparatus 600 and apparatus 700 described below.

Algorithm 400 may start at 410 at which a user of an apparatus (e.g., apparatus 110, apparatus 120, apparatus 210 or apparatus 220) launching an application (e.g., camera application) on the apparatus. Algorithm 400 may proceed from 410 to 420.

At 420, algorithm 400 may involve the apparatus determining whether a physical device for performing one or more tasks associated with the launched application (e.g., local camera device) is present. In an event that the apparatus determines that a physical device is present, algorithm 400 may proceed from 420 to 450 and consider the launch of the application a success since the physical device may be utilized to perform one or more tasks associated with the launched application. In an event that the apparatus determines that no physical device is present, algorithm 400 may proceed from 420 to 430.

At 430, algorithm 400 may involve the apparatus determining whether a virtual device is present. In an event that the apparatus determines that a virtual device is present, algorithm 400 may proceed from 430 to 450 and consider the launch of the application a success since the virtual device may be utilized to perform one or more tasks associated with the launched application. In an event that the apparatus determines that no virtual device is present, algorithm 400 may proceed from 430 to 440 at which algorithm 400 may consider the launch of the application a failure since no physical or virtual device could be utilized to perform one or more tasks associated with the launched application.

Figure 5:
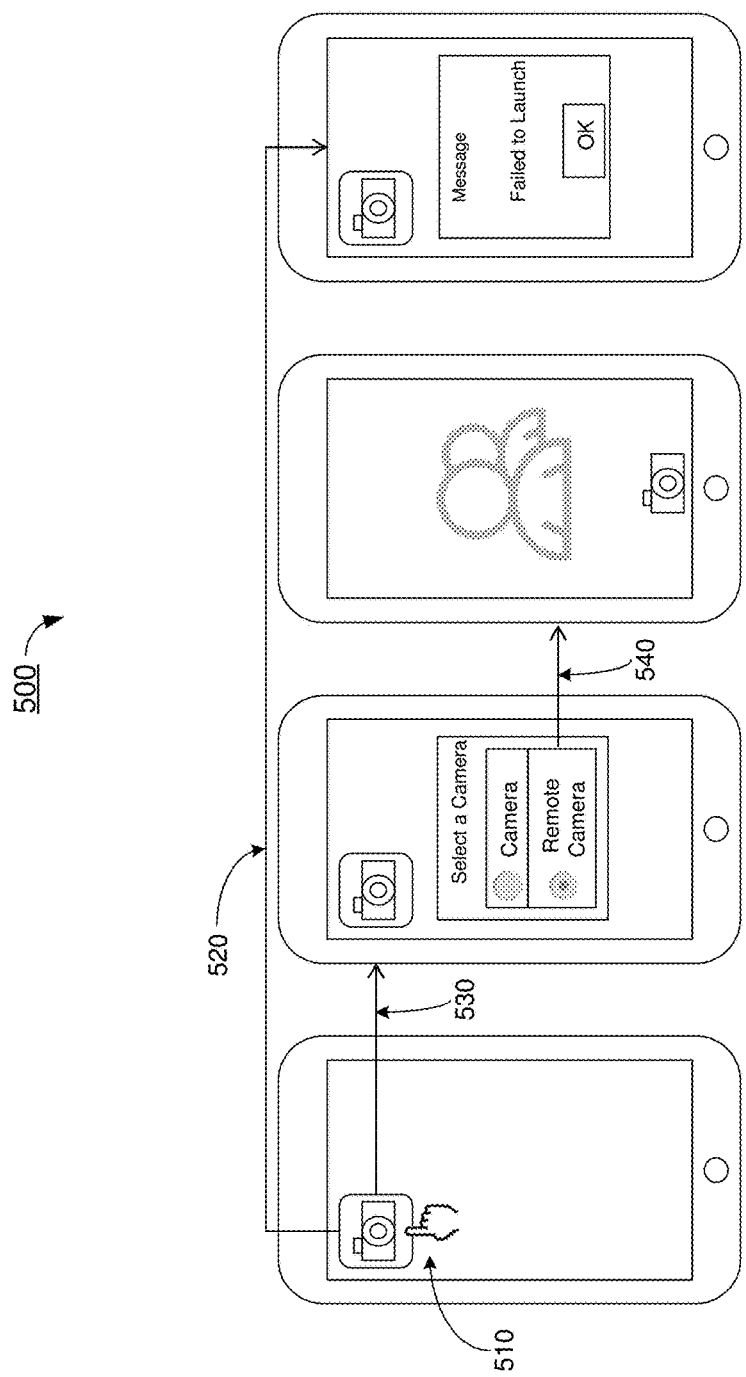
FIG. 5 is a diagram of an example scenario in accordance with an implementation of the present disclosure.

FIG. 5 illustrates an example scenario 500 in accordance with an implementation of the present disclosure. Scenario 500 depicts a user interface (UI) flow with respect to a smartphone or tablet computer in which techniques in accordance with the present disclosure are implemented. Scenario 500 may include one or more operations, actions, or functions such as actions 510, 520, 530 and 540. Scenario 500 may represent an example implementation of algorithm 400.

At 510, a user may start or otherwise launch a camera application on a smartphone or tablet computer.

At 520, in an event that neither a physical (local) camera nor a virtual (remote) camera is available or present, the smartphone or tablet computer may display a message to the user to indicate that the camera application has failed to launch upon determining that no physical (local) camera or virtual (remote) camera is available or present.

At 530, in an event that either or both of a physical (local) camera and a virtual (remote) camera is/are available or present, the smartphone or tablet computer may display a message to the user to indicate that either or both of a physical (local) camera and a virtual (remote) camera is/are available or present. In the example shown in FIG. 5, when both a physical (local) camera and a virtual (remote) camera are available or present, the smartphone or tablet computer may display a menu for the user to select a camera between the physical (local) camera and the virtual (remote) camera for the user to use.

At 540, the smartphone or tablet computer starts or otherwise launches the camera application utilizing the available or the selected camera, whether the physical (local) camera or the virtual (remote) camera.

Figure 6:
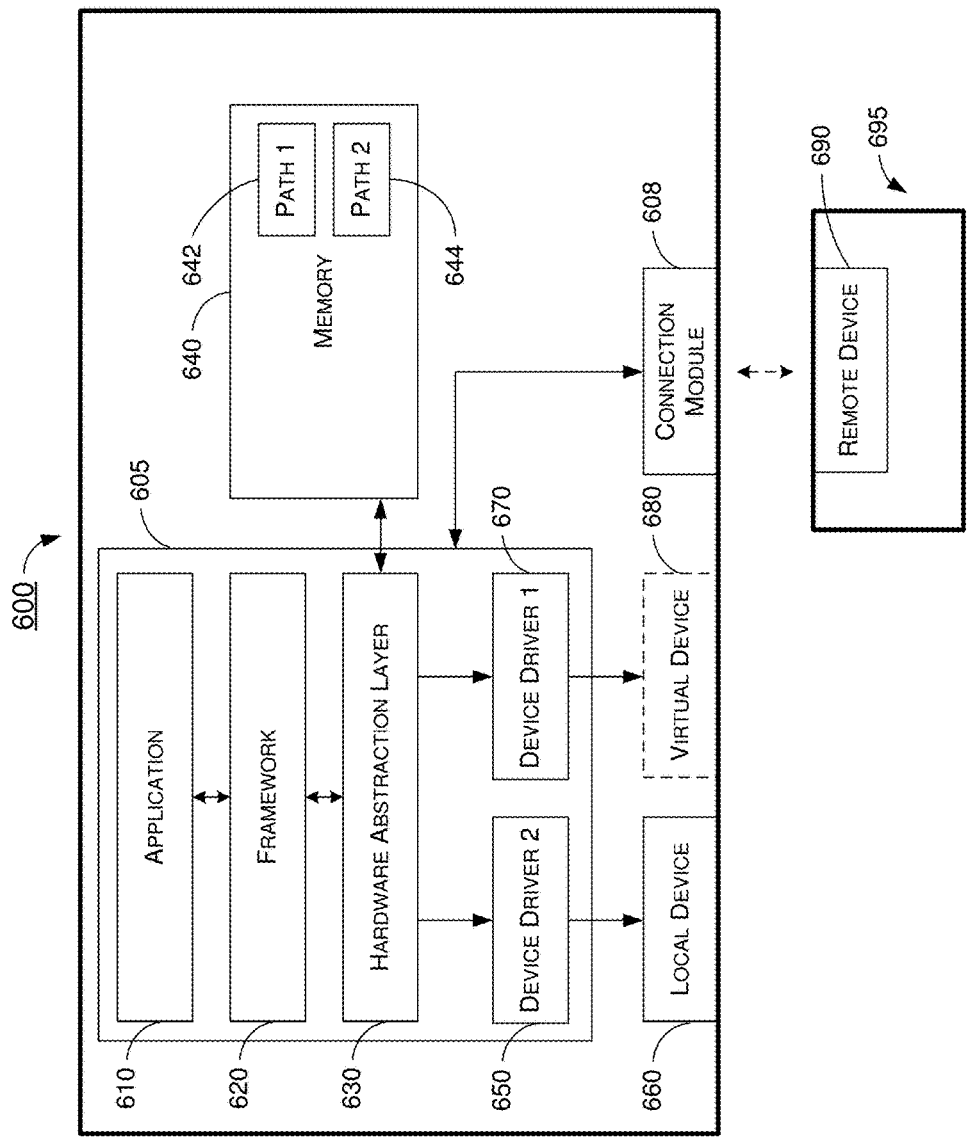
FIG. 6 is a diagram of an example apparatus in accordance with an implementation of the present disclosure.

FIG. 6 illustrates an example apparatus 600 in accordance with an implementation of the present disclosure. Apparatus 600 may perform various functions to implement techniques, methods and systems described herein, including scenarios 100, 200 and 500 and algorithms 300 and 400 described above as well as scenarios 1100, 1200, 1300, 1400 and 1500, algorithms 800, 900 and 1000, and processes 1600, 1700 and 1800 described below. Apparatus 600 may be an example implementation of apparatus 110, apparatus 120, apparatus 210 and/or apparatus 220. In some implementations, apparatus 600 may be implemented in the form of a single integrated-circuit (IC) chip or a chipset of multiple IC chips. In some implementations, apparatus 600 may be an electronic apparatus which may be a computing apparatus, a portable apparatus or a wearable apparatus. For instance, apparatus 600 may be a smartphone, smartwatch, a computing device such as a tablet computer, a laptop computer, a notebook computer, or a wearable device. In some implementations, apparatus 600 may be an electrical appliance such as a TV for example. Apparatus 600 may include at least those components shown in FIG. 6, such as a processing unit 605 which may be configured to execute, establish and/or maintain an application 610, a framework 620, a hardware abstraction layer (HAL) 630. Apparatus 600 may also include a connection module 608, a memory 640 associated with HAL 630, a local device driver 650 and a physical/local device 660.

Apparatus 600 may be configured to cross-mount (e.g., connect to and operate) a remote device 690 associated with another apparatus 695 as its own through HAL 630. For instance, application 610 may initially, via local device driver 650, operate local device 660 (e.g., a low-resolution camera) to perform some tasks (e.g., taking photos). Memory 640 may store a path 644 that points to local device driver 650, and HAL 630 may be configured to utilize the device driver to which path 644 points (i.e., local device driver 650). Subsequently, connection module 608 may detect or otherwise discover the presence of remote device 690 (e.g., a high-resolution camera) and establish a wireless or wired communication connection with remote device 690. This enables apparatus 600 to seamlessly cross-mount remote device 690 to operate remote device 690, as if remote device 690 is installed on and a part of apparatus 600. Processing unit 605 may do so by automatically establishing a virtual device 680 and installing, downloading or otherwise obtaining a remote device driver 670 associated with virtual device 680. Processing unit 605 may add a path 642 in memory 640 to point to remote device driver 670, and HAL 630 may be modified to utilize the device driver to which path 642 points (i.e., remote device driver 670). Alternatively, processing unit 605 may modify or otherwise replace path 644 with path 642 with HAL 630 configured to utilize the device driver to which the modified path 644 (containing value of path 642) points. During the period of time when remote device 690 is utilized by apparatus 600 via remote device driver 670, processing unit 605 may temporarily disable local device driver 650.

When apparatus 600 no longer needs to utilize remote device 690 or when apparatus 600 needs to dismount virtual device 680 (e.g., when remote device 690 is out of range such as being too far away for wireless communication through Bluetooth or Wi-Fi), processing unit 605 may seamlessly restore the original path 644 for HAL 630 to utilize the device driver to which path 642 points (e.g., local device driver 650). Processing unit 605 may do so by restoring memory 640 back to its original configuration in which original value of path 644 is stored in memory 640.

Figure 7:
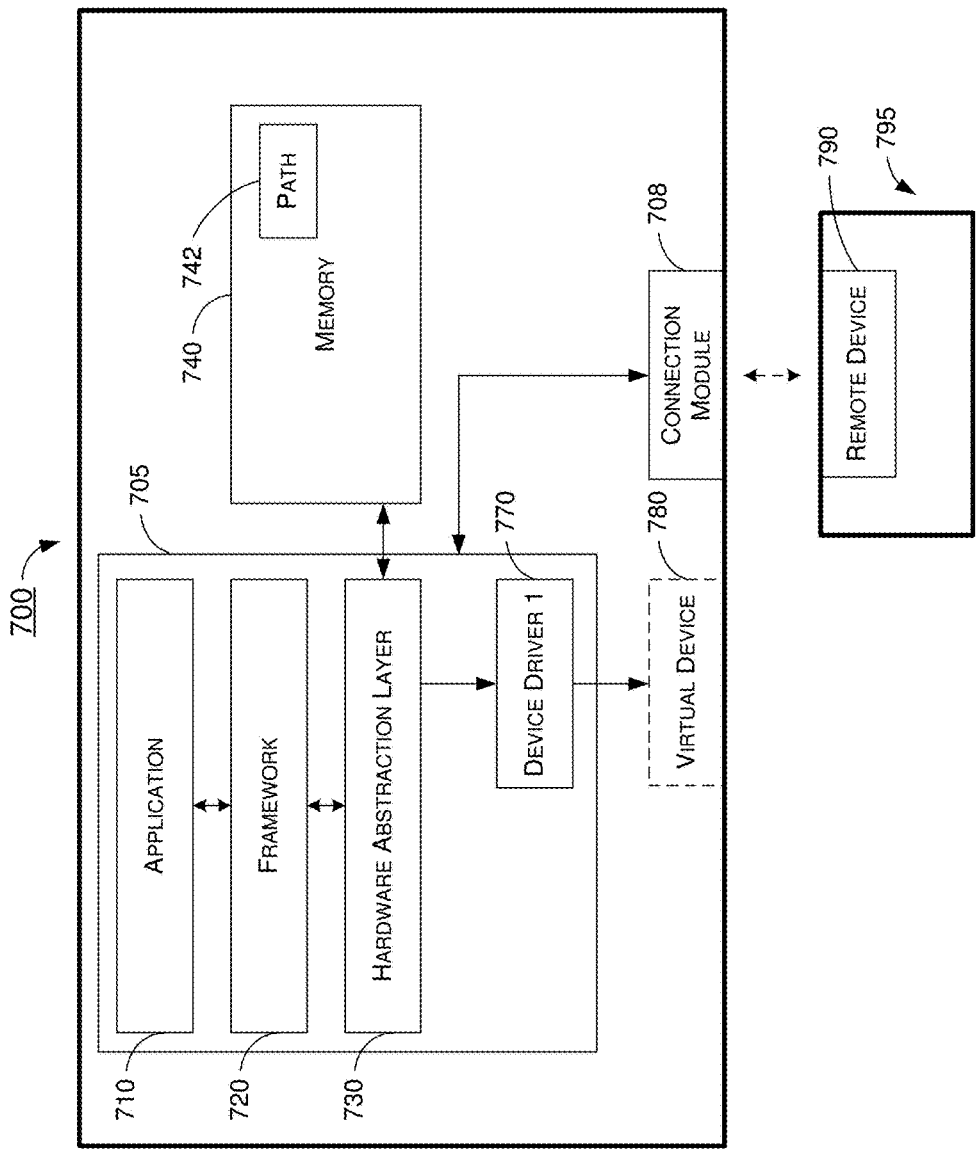
FIG. 7 is a diagram of an example apparatus in accordance with another implementation of the present disclosure.

FIG. 7 illustrates an example apparatus 700 in accordance with another implementation of the present disclosure. Apparatus 700 may perform various functions to implement techniques, methods and systems described herein, including scenarios 100, 200 and 500 and algorithms 300 and 400 described above as well as scenarios 1100, 1200, 1300, 1400 and 1500, algorithms 800, 900 and 1000, and processes

1600, 1700 and 1800 described below. Apparatus 700 may be an example implementation of apparatus 110, apparatus 120, apparatus 210 and/or apparatus 220. In some implementations, apparatus 700 may be implemented in the form of a single IC chip or a chipset of multiple IC chips. In some implementations, apparatus 700 may be an electronic apparatus which may be a computing apparatus, a portable apparatus or a wearable apparatus. For instance, apparatus 700 may be a smartphone, a computing device such as a tablet computer, a laptop computer, a notebook computer, or a wearable device. In some implementations, apparatus 700 may be an electrical appliance such as a TV for example. Apparatus 700 may include at least those components shown in FIG. 7, such as a processing unit 705 which may be configured to execute, establish and/or maintain an application 710, a framework 720, a HAL 730. Apparatus 700 may also include a connection module 708 and a memory 740 associated with HAL 730.

Apparatus 700 may be configured to cross-mount (e.g., connect to and operate) a remote device 790 associated with another apparatus 795 as its own through HAL 730. For instance, connection module 708 may detect or otherwise discover the presence of remote device 790 (e.g., a camera) and establish a wireless or wired communication connection with remote device 790. This enables apparatus 700 to seamlessly cross-mount remote device 790 to operate remote device 790, as if remote device 790 is installed on and a part of apparatus 700. Processing unit 705 may do so by automatically establishing a virtual device 780 and installing, downloading or otherwise obtaining a remote device driver 770 associated with virtual device 780. Processing unit 705 may add or modify a path 742 in memory 740 to point to remote device driver 770, and HAL 730 may be configured to utilize the device driver to which path 742 points (i.e., remote device driver 770).

When apparatus 700 no longer needs to utilize remote device 790 or when apparatus 700 needs to dismount virtual device 780 (e.g., when remote device 790 is out of range such as being too far away for wireless communication through Bluetooth or Wi-Fi), processing unit 705 may seamlessly restore memory 740 back to its original configuration.

Figure 8:
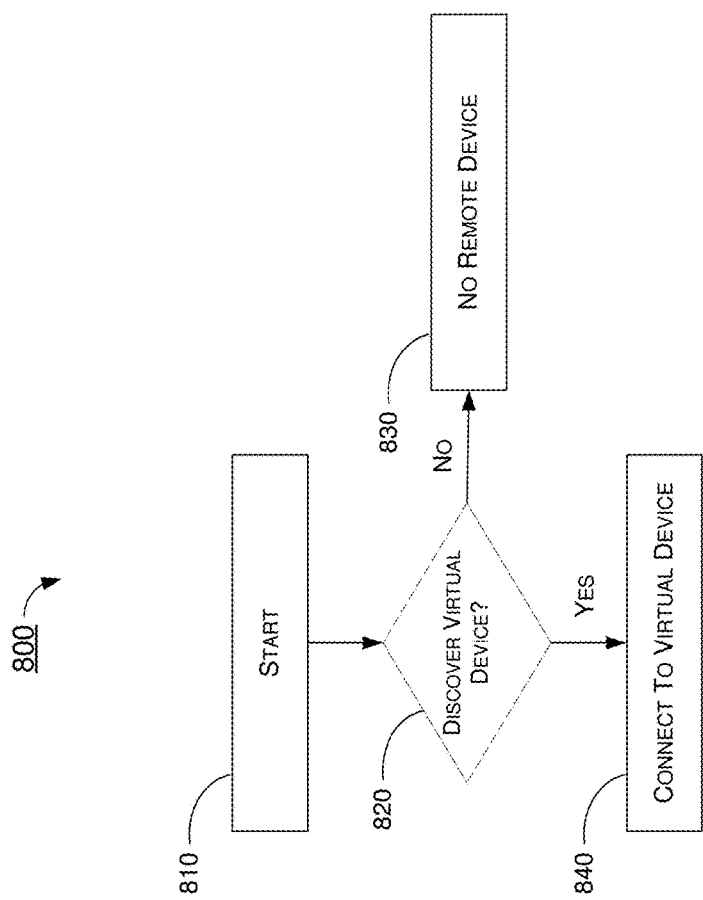
FIG. 8 is a diagram of an example algorithm in accordance with an implementation of the present disclosure.

FIG. 8 illustrates an example algorithm 800 of cross-mounting a virtual device in accordance with an implementation of the present disclosure. Algorithm 800 may include one or more operations, actions, or functions as represented by one or more blocks such as blocks 810, 820, 830 and 840. Although illustrated as discrete blocks, various blocks of algorithm 800 may be divided into additional blocks, combined into fewer blocks, or eliminated, depending on the desired implementation. Algorithm 800 may be implemented in each of apparatus 110, apparatus 120, apparatus 210, apparatus 220, apparatus 600 and apparatus 700.

Algorithm 800 may start at 810 and proceed to 820. At 820, algorithm 800 may involve an apparatus (e.g., apparatus 110, apparatus 120, apparatus 210, apparatus 220, apparatus 600 or apparatus 700) determining, detecting or otherwise discovering whether any remote device as a virtual device is present. In an event that no virtual device is present, algorithm 800 may proceed from 820 to 830 as there is no remote device. In an event that a virtual device is present, algorithm 800 may proceed from 820 to 840.

At 840, algorithm 800 may involve the apparatus connecting with the remote device as a virtual device to utilize the virtual device as its own in performing one or more tasks/operations. For instance, the apparatus may automatically connect with the discovered virtual device as its own device. Alternatively, the apparatus may automatically connect with the virtual device as its own device by one or more predetermined criteria. As an example, the apparatus may acquire one or more device capabilities or specification configurations for virtual devices during the discovery at 820. In some implementations, the apparatus may automatically connect with the virtual device by comparing one or more characteristics of the virtual device indicative of capabilities of the virtual device with corresponding one or more characteristics of a local device or another virtual device. This feature allows the apparatus the ability to select a hardware component with optimal performance (e.g., a camera with higher resolution, a GPS with better precision, an accelerator with better accuracy and/or a pedometer with better precision) for automatic cross-mounting. In some implementations, the apparatus may automatically cross-mount one or more virtual devices according to power budget. Alternatively, the apparatus may list all device options, including all virtual devise, for a user to select for connection. Thus, the apparatus may seamlessly access hardware resource(s) on another apparatus as virtual device(s) by cross-mounting in accordance with the present disclosure.

Figure 9:
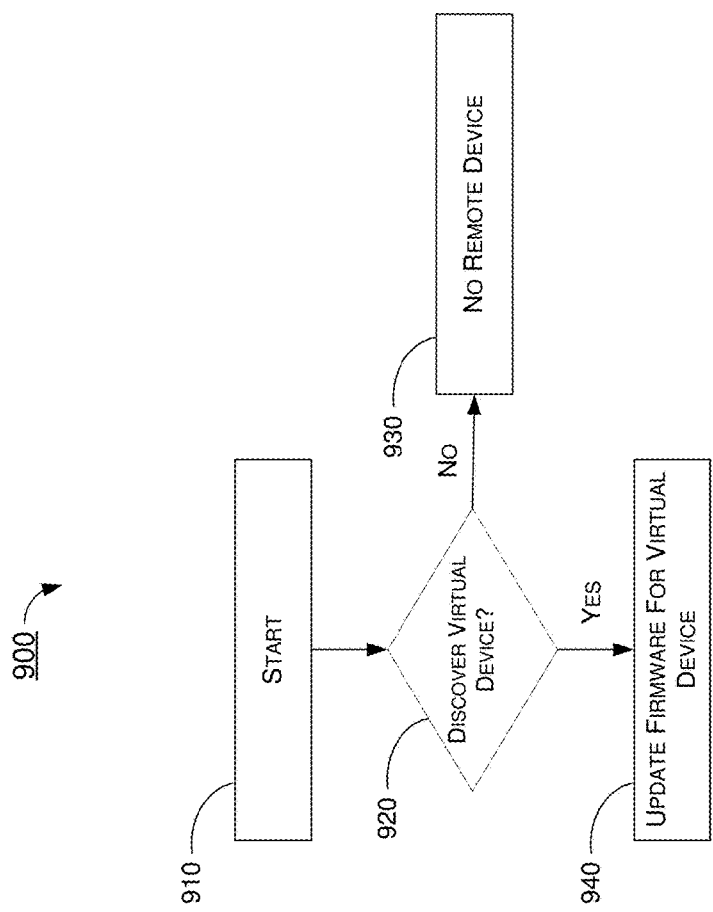
FIG. 9 is a diagram of an example algorithm in accordance with another implementation of the present disclosure.

FIG. 9 illustrates an example algorithm 900 of updating firmware of a virtual device for cross-mounting in accordance with another implementation of the present disclosure. Algorithm 900 may include one or more operations, actions, or functions as represented by one or more blocks such as blocks 910, 920, 930 and 940. Although illustrated as discrete blocks, various blocks of algorithm 900 may be divided into additional blocks, combined into fewer blocks, or eliminated, depending on the desired implementation. Algorithm 900 may be implemented in each of apparatus 110, apparatus 120, apparatus 210, apparatus 220, apparatus 600 and apparatus 700.

Algorithm 900 may start at 910 and proceed to 920. At 920, algorithm 900 may involve an apparatus (e.g., apparatus 110, apparatus 120, apparatus 210, apparatus 220, apparatus 600 or apparatus 700) determining, detecting or otherwise discovering whether any remote device as a virtual device is present. In an event that no virtual device is present, algorithm 900 may proceed from 920 to 930 as there is no remote device. In an event that a virtual device is present, algorithm 900 may proceed from 920 to 940.

At 940, algorithm 900 may involve the apparatus updating a firmware associated with the virtual device or an OS of the apparatus. Algorithm 900 may also involve the apparatus connecting with the virtual device as its own device to perform one or more tasks/operations. For instance, a tablet computer without a touch identification (ID) sensor may have an OS of version 6.1 installed thereon. The apparatus may update a corresponding firmware or the OS to a version 8.1 when cross-mounting a touch ID sensor on a smartphone as the tablet computer's own device. In some implementations, no firmware update is required for a subsequent cross-mounting.

Figure 10:
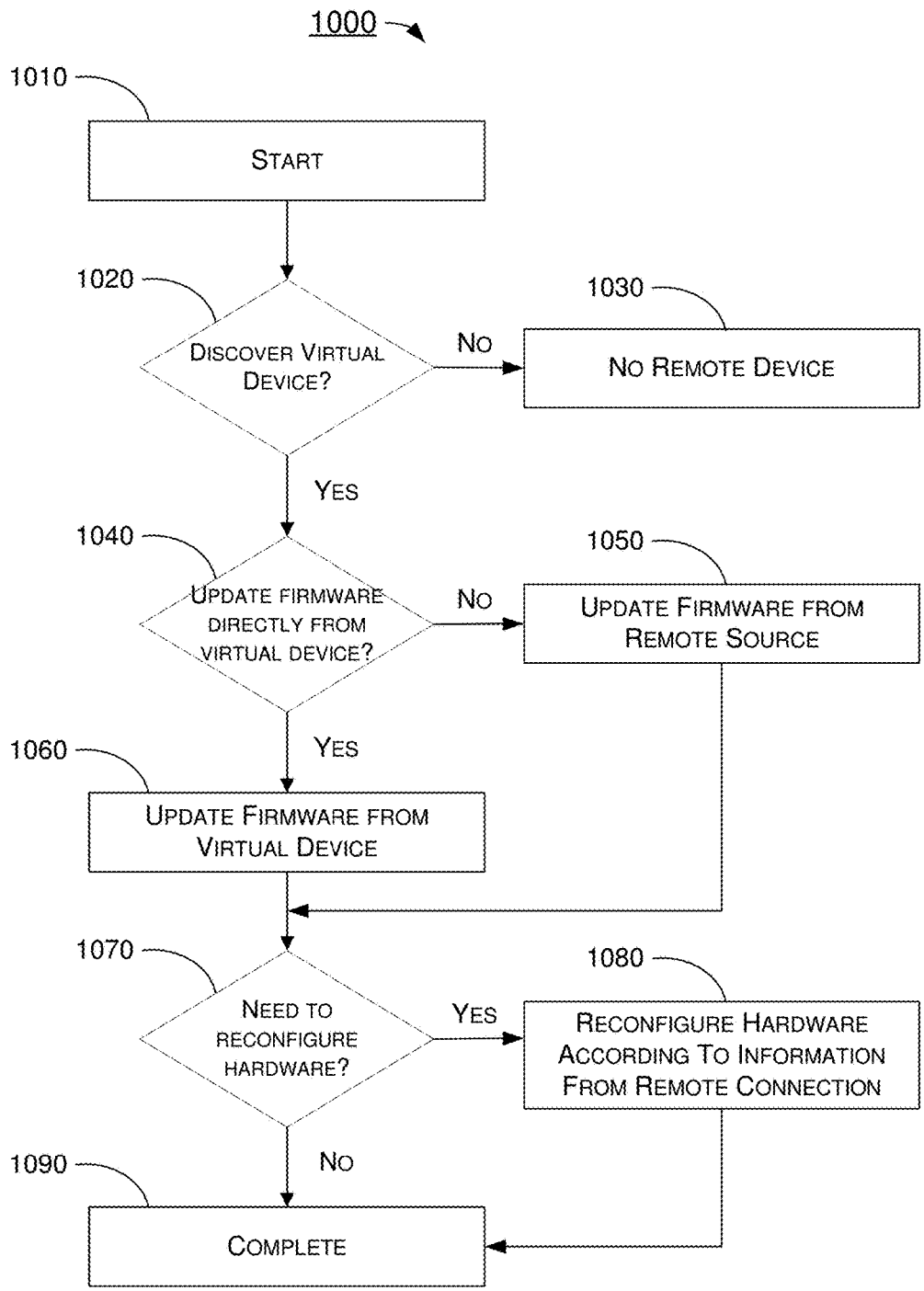
FIG. 10 is a diagram of an example algorithm in accordance with yet another implementation of the present disclosure.

FIG. 10 illustrates an example algorithm 1000 of updating firmware of a virtual device for cross-mounting in accordance with yet another implementation of the present disclosure. Algorithm 1000 may include one or more operations, actions, or functions as represented by one or more blocks such as blocks 1010, 1020, 1030, 1040, 1050, 1060, 1070, 1080 and 1090. Although illustrated as discrete blocks, various blocks of algorithm 1000 may be divided into additional blocks, combined into fewer blocks, or eliminated, depending on the desired implementation. Algorithm 1000 may be implemented in each of apparatus 110, apparatus 120, apparatus 210, apparatus 220, apparatus 600 and apparatus 700.

Algorithm 1000 may start at 1010 and proceed to 1020. At 1020, algorithm 1000 may involve an apparatus (e.g., apparatus 110, apparatus 120, apparatus 210, apparatus 220, apparatus 600 or apparatus 700) determining, detecting or otherwise discovering whether any remote device as a virtual device is present. In an event that no virtual device is present, algorithm 1000 may proceed from 1020 to 1030 as there is no remote device. In an event that a virtual device is present, algorithm 1000 may proceed from 1020 to 1040.

At 1040, algorithm 1000 may involve the apparatus checking update policy and determining whether a firmware update may be obtained from the virtual device or a remote source (e.g., a cloud-based server). In an event that it is determined that the firmware update may be obtained from the virtual device, algorithm 1000 may proceed from 1040 to 1060. In an event that it is determined that the firmware update may be obtained from the remote source, algorithm 1000 may proceed from 1040 to 1050.

At 1050, algorithm 1000 may involve the apparatus updating a firmware by obtaining the update code/patch from the remote source. Algorithm 1000 may proceed from 1050 to 1070.

At 1060, algorithm 1000 may involve the apparatus updating the firmware by obtaining the update code/patch from the virtual device. Algorithm 1000 may proceed from 1060 to 1070.

At 1070, algorithm 1000 may determine whether there is a need to reconfigure a hardware component of the apparatus or the remote device. In an event that it is determined that there is a need to reconfigure the hardware component, algorithm 1000 may proceed from 1070 to 1080. In an event that it is determined that there is no need to reconfigure the hardware component, algorithm 1000 may proceed from 1070 to 1090.

At 1080, algorithm 1000 may reconfigure one or more parameters of the hardware component according to information received from the remote source or virtual device. For instance, one or more parameters of a current configuration associated with the hardware component may be reconfigured to a different or previous setting. Algorithm 1000 may proceed from 1080 to 1090.

At 1090, algorithm 1000 may complete to set configuration and the user may utilize the remote device seamlessly.

Figure 11:
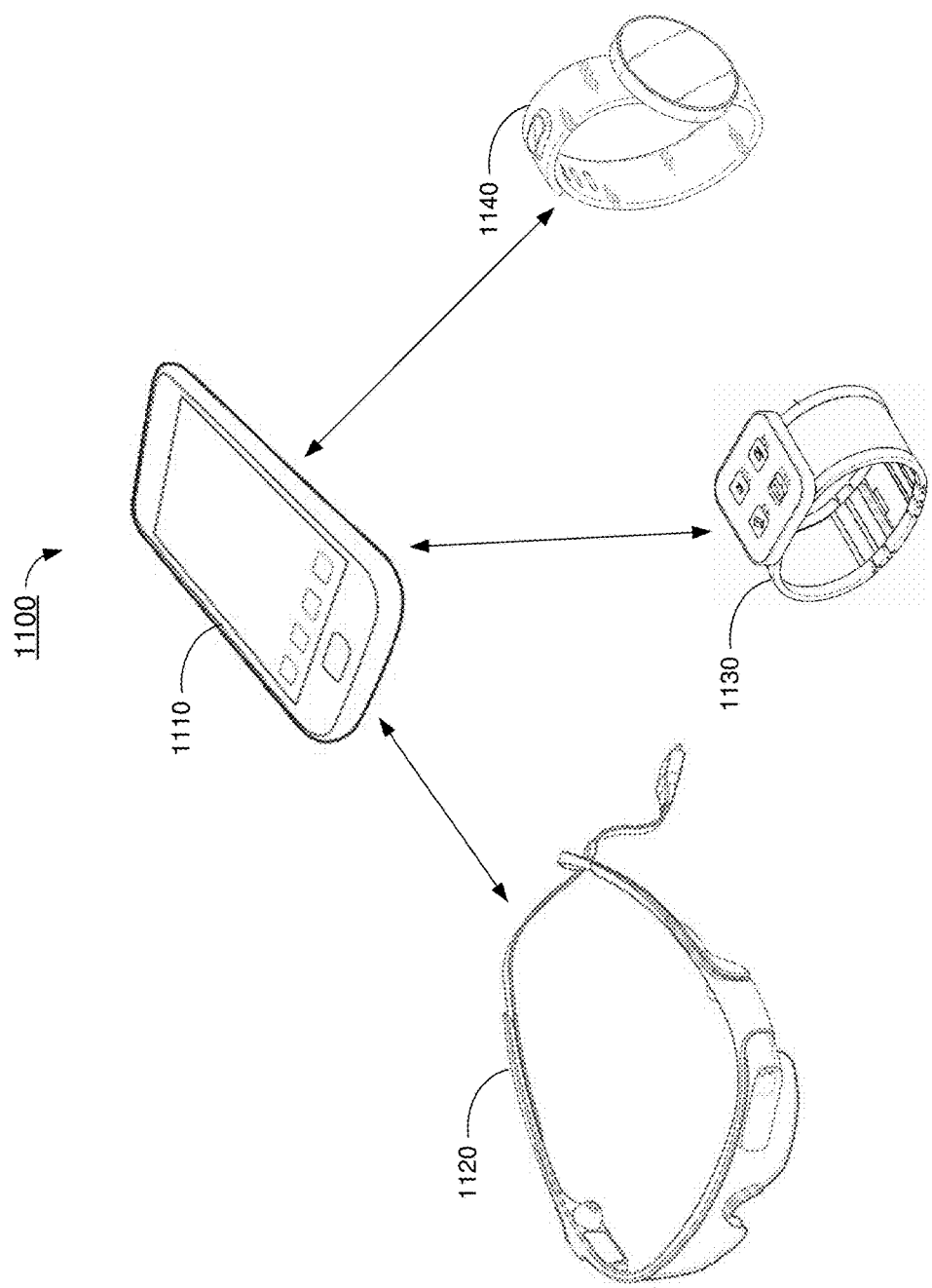
FIG. 11 is a diagram of an example scenario in accordance with an implementation of the present disclosure.

FIG. 11 illustrates an example scenario 1100 in accordance with an implementation of the present disclosure. In scenario 1100, a user may carry multiple portable devices/apparatuses such as a smartphone 1110, a first wearable device 1120, a second wearable device 1130 and a third wearable device 1140. These devices/apparatuses may be clustered as a device group for cross-mounting. Moreover, this device group may include multiple devices/apparatuses (e.g., TV) at the user's home, work place and/or one or more other locations frequented by the user. Seamless cross-mounting in accordance with the present disclosure may improve convenience for the user as well as power saving. For instance, the user may take a high-resolution picture with second wearable device 1130 by utilizing a camera equipped on smartphone 1110. In this example, second wearable device 1130 may cross-mount the camera of smartphone 1110 as its virtual camera. Second wearable device 1130 may read data, e.g., video stream, generated by the camera on smartphone 1110 and transmitted to second wearable device 1130 by Bluetooth low energy (BLE), Bluetooth, Wi-Fi, High-Definition Multimedia Interface (HDMI), Universal Serial Bus (USB), radio-frequency identification (RFID) or any other suitable wired or wireless communication technology/protocol.

Figure 12:
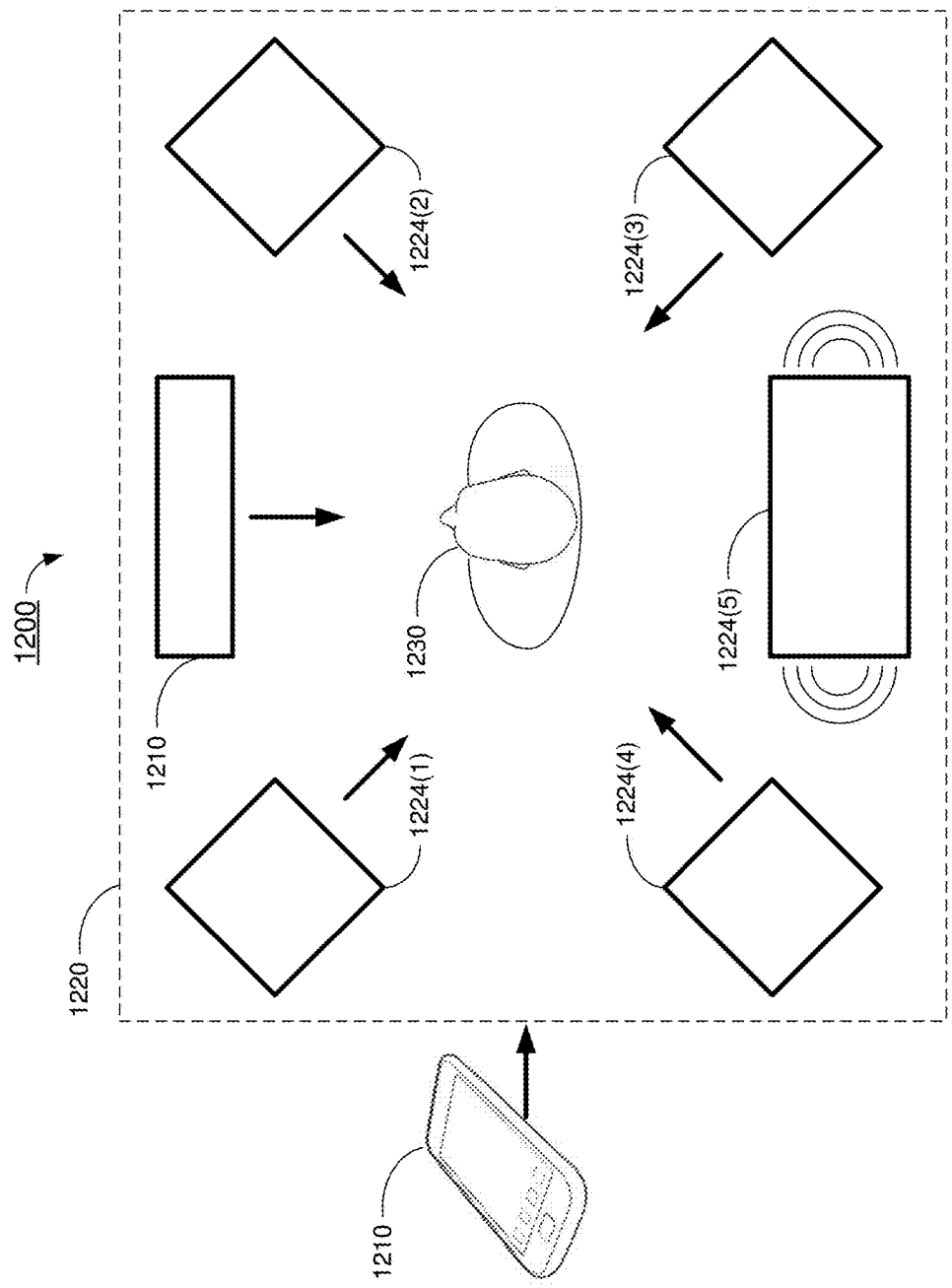
FIG. 12 is a diagram of an example scenario in accordance with another implementation of the present disclosure.

FIG. 12 illustrates an example scenario 1200 in accordance with another implementation of the present disclosure. In scenario 1200, a 5.1 surround sound system 1220 may be realized by cross-mounting devices in accordance with implementations of the present disclosure. This may be achieved by collecting six speaker-equipped apparatuses (e.g., phones/smartphones) 1210 and 1224(1)-1224(5) and placing them at rough positions around a user 1230 to emulate a 5.1 surround sound system 1220 for user 1230. For instance, apparatus 1210 (e.g., a smartphone) may be used to cross-mount the speakers of the other five apparatuses 1224(1)-1224(5), and may be placed at the position of a center speaker relative to user 1230. The other five apparatuses 1224(1)-1224(5) may be placed at front left, front right, rear left, rear right and subwoofer positions relative to user 1230, respectively. These six apparatuses 1210 and 1224(1)-1224(5) may operate together as 5.1 surround sound system 1220 through their respective speakers. In some implementations, the six apparatuses 1210 and 1224(1)-1224(5) may perform a sound calibration to provide an optimal sound output.

It is noteworthy that scenario 1200 is provided for illustrative purpose and does not limit the scope of the present disclosure. That is, any of the apparatuses 1210 and 1224(1)-1224(5) may further provide video display for user 1230. Moreover, the actual number of apparatuses utilized to implement a surround sound system may vary and thus different from what is shown in scenario 1200, e.g., to realize a 2.1 or 7.1 surround sound system.

Figure 13:
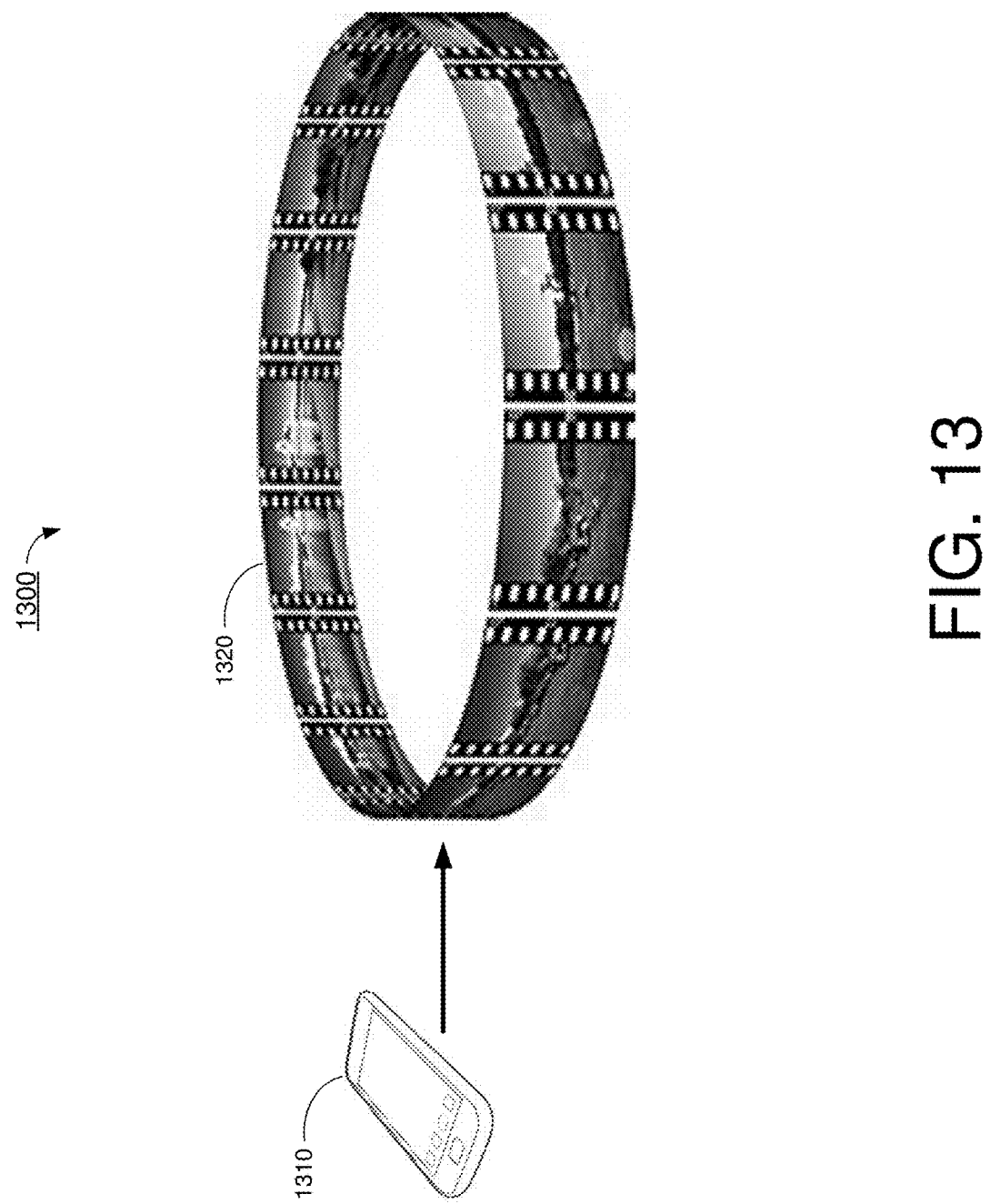
FIG. 13 is a diagram of an example scenario in accordance with yet another implementation of the present disclosure.

FIG. 13 illustrates an example scenario 1300 in accordance with yet another implementation of the present disclosure. In scenario 1300, a panoramic photograph 1320 may be realized by cross-mounting imaging devices (e.g., cameras) in accordance with implementations of the present disclosure. This may be achieved by collecting multiple camera-equipped apparatuses such as apparatus 1310 (e.g., a smartphone) and placing them at rough positions to capture panoramic photograph 1320 by one shot. For instance, one of the multiple apparatuses may cross-mount the cameras/image sensors on the remaining apparatuses to perform a position calibration to obtain panoramic photograph 1320.

It is noteworthy that scenario 1300 is provided for illustrative purpose and does not limit the scope of the present disclosure. That is, various modifications and/or derivative arrangements may be made to obtain other types of photographs (e.g., three-dimensional photographs).

Figure 14:
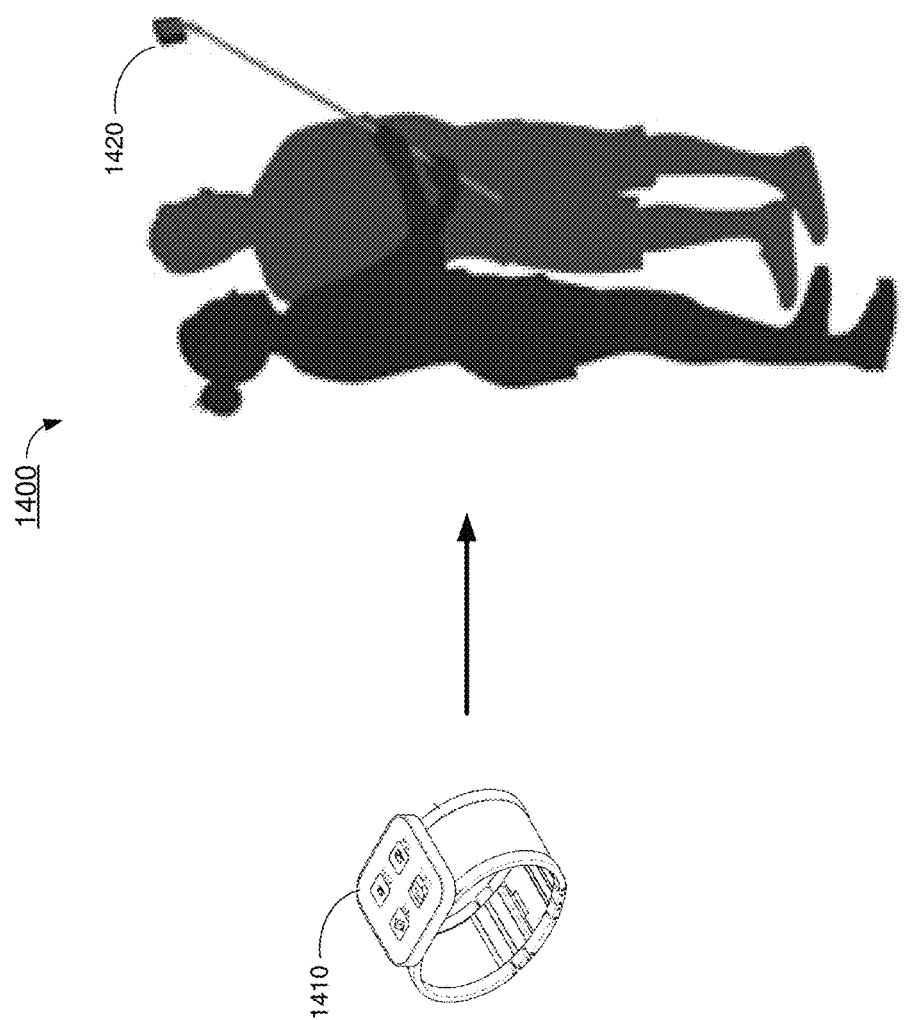
FIG. 14 is a diagram of an example scenario in accordance with still another implementation of the present disclosure.

FIG. 14 illustrates an example scenario 1400 in accordance with still another implementation of the present disclosure. In scenario 1400, flexible selfie (or self-portrait) may be realized by cross-mounting devices in accordance with implementations of the present disclosure. For instance, a user may cross-mount a smartwatch 1410 with a camera on a smartphone 1420, as the smartphone 1420 may be equipped with one or more cameras. In some implementations, the smartwatch 1410 may provide an option for the user to preview image(s) captured by the camera on smartphone 1420.

Figure 15:
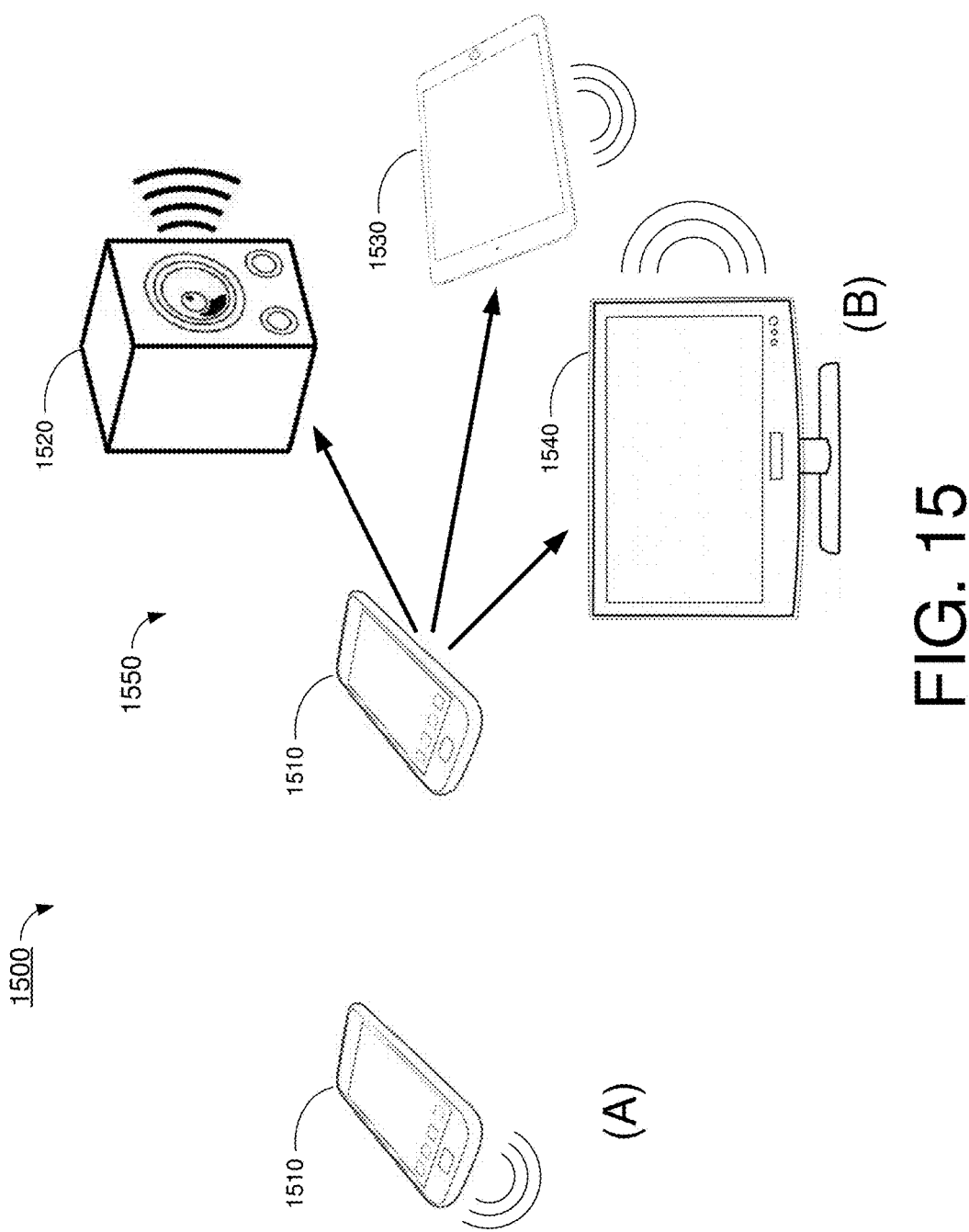
FIG. 15 is a diagram of an example scenario in accordance with a further implementation of the present disclosure.

FIG. 15 illustrates an example scenario 1500 in accordance with a further implementation of the present disclosure. In scenario 1500, one or more peripheral devices of an apparatus 1510 may be reconfigured automatically in different environments. For instance, when there is no other speaker-equipped device/apparatus is around or near apparatus 1510, the speaker on apparatus 1510 may be configured to operate as a single speaker. When apparatus 1510 is in an environment 1550 (e.g., home) in which apparatus 1510 is surrounded or near one or more other speaker-equipped apparatuses such as apparatus 1520, apparatus 1530 and apparatus 1540, apparatus 1510 may cross-mount the speakers of apparatus 1520, apparatus 1530 and apparatus 1540. The speaker of apparatus 1510 may be reconfigured to adapt to operate as one of multiple speakers of a multi-channel speaker system.

Figure 16:
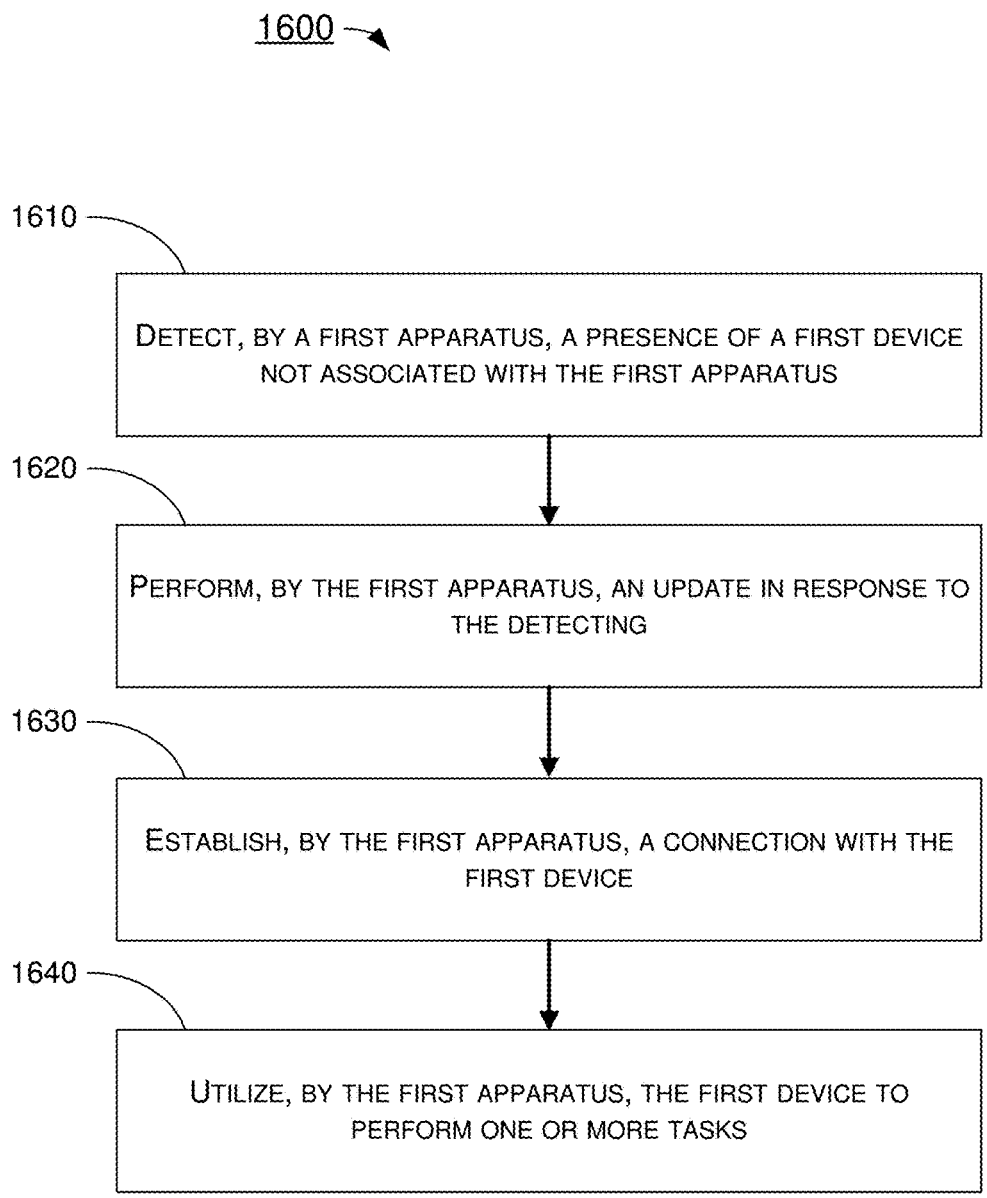
FIG. 16 is a flowchart of an example process in accordance with an implementation of the present disclosure.

FIG. 16 illustrates an example process 1600 in accordance with an implementation of the present disclosure. Process 1600 may include one or more operations, actions, or functions as represented by one or more blocks such as blocks 1610, 1620, 1630 and 1640. Although illustrated as discrete blocks, various blocks of process 1600 may be divided into additional blocks, combined into fewer blocks, or eliminated, depending on the desired implementation. The blocks may be performed in the order shown in FIG. 16 or in any other order, depending on the desired implementation. Process 1600 may be implemented by apparatus 110, apparatus 120, apparatus 210, apparatus 220, apparatus 600 and apparatus 700. Solely for illustrative purpose and without limiting the scope of the present disclosure, process 1600 is described below in the context of process 1600 being performed by apparatus 600. Process 1600 may begin at 1610.

At 1610, process 1600 may involve apparatus 600 detecting or otherwise discovering a presence of remote device 690, which is associated with another apparatus 695 and not a part of apparatus 600. Process 1600 may proceed from 1610 to 1620.

At 1620, process 1600 may involve apparatus 600 performing an update in response to the detecting the presence of remote device 690. Process 1600 may end at 1620 or, alternatively, may optionally include additional operations as depicted in blocks 1630 and 1640, and process 1600 may proceed from 1620 to 1630.

At 1630, process 1600 may involve apparatus 600 establishing a communication connection with remote device 690. Process 1600 may proceed from 1630 to 1640.

At 1640, process 1600 may involve apparatus 600 utilizing remote device 690 to perform one or more tasks. For instance, apparatus 600 may generate, create, construct or otherwise establish virtual device 680 which may reflect remote device 690 so as to enable apparatus 600 to command, direct or otherwise drive remote device 690 to perform one or more tasks by way of commanding, directing or otherwise driving virtual device 680 via remote device driver 670.

In some implementations, in performing the update, process 1600 may involve apparatus 600 updating an existing firmware or installing a new firmware to operate remote device 690. Alternatively or additionally, in performing the update, process 1600 may involve apparatus 600 updating an existing device driver (e.g., local device driver 650) or installing a new device driver (e.g., remote device driver 670) to operate remote device 690. Alternatively or additionally, in performing the update, process 1600 may involve apparatus 600 updating an OS or installing a new OS to operate remote device 690.

Figure 17:
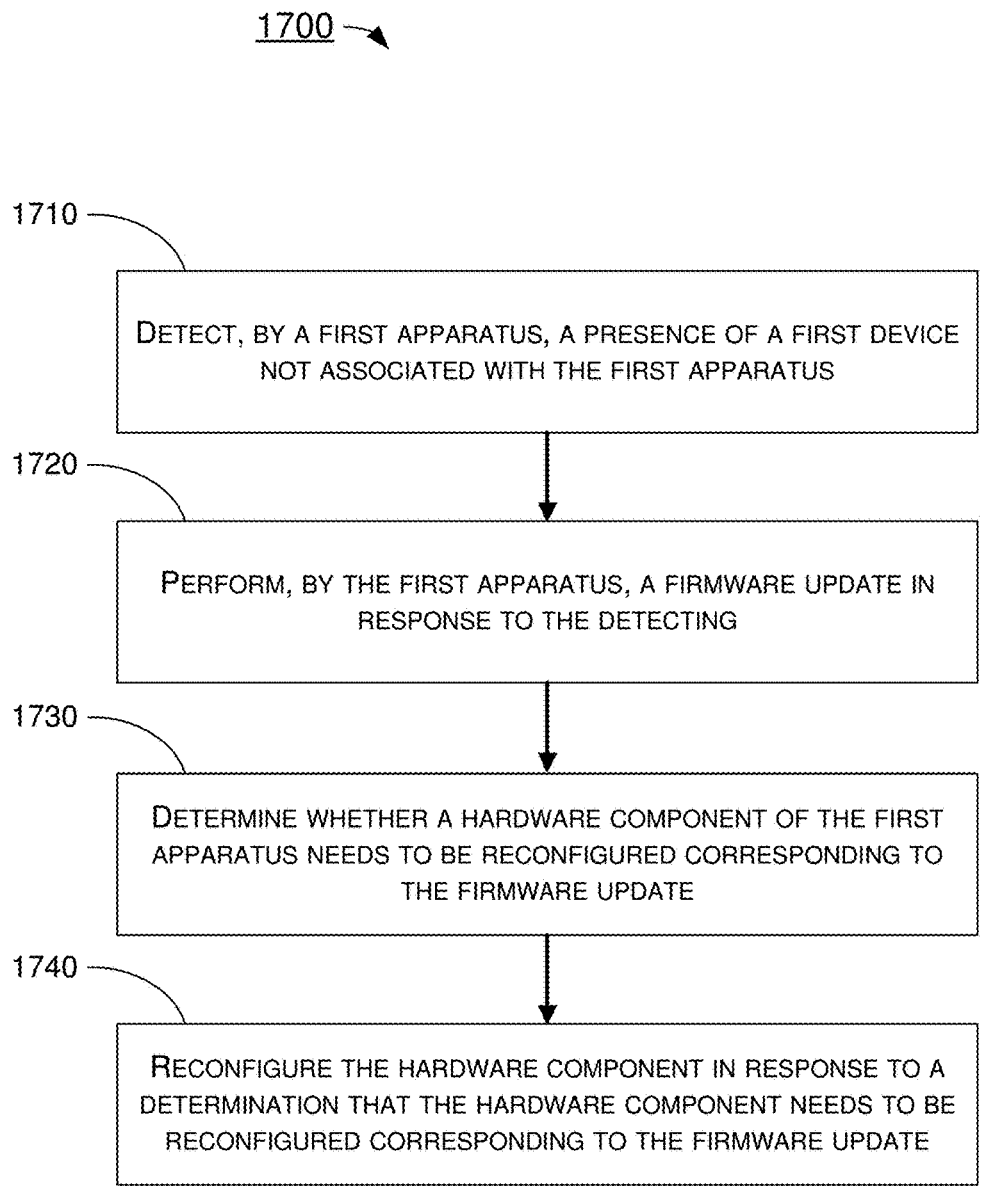
FIG. 17 is a flowchart of an example process in accordance with another implementation of the present disclosure.

FIG. 17 illustrates an example process 1700 in accordance with another implementation of the present disclosure. Process 1700 may include one or more operations, actions, or functions as represented by one or more blocks such as blocks 1710, 1720, 1730 and 1740. Although illustrated as discrete blocks, various blocks of process 1700 may be divided into additional blocks, combined into fewer blocks, or eliminated, depending on the desired implementation. The blocks may be performed in the order shown in FIG. 17 or in any other order, depending on the desired implementation. Process 1700 may be implemented by apparatus 110, apparatus 120, apparatus 210, apparatus 220, apparatus 600 and apparatus 700. Solely for illustrative purpose and without limiting the scope of the present disclosure, process 1700 is described below in the context of process 1700 being performed by apparatus 600. Process 1700 may begin at 1710.

At 1710, process 1700 may involve apparatus 600 detecting or otherwise discovering a presence of a remote device 690 not a part of apparatus 600. Remote device 690 may be associated with another apparatus 695 which is physically separate from apparatus 600. Process 1700 may proceed from 1710 to 1720.

At 1720, process 1700 may involve apparatus 600 performing firmware update in response to the detecting of the presence of remote device 690. Process 1700 may end at 1720 or, alternatively, may optionally include additional operations as depicted in blocks 1730 and 1740, and process 1700 may proceed from 1720 to 1730.

At 1730, process 1700 may involve apparatus 600 determining whether a hardware component of local device 660 or remote device 690 needs to be reconfigured. Process 1700 may proceed from 1730 to 1740.

At 1740, process 1700 may involve apparatus 600 reconfiguring the hardware component in response to a determination that the hardware component needs to be reconfigured.

In some implementations, in performing the firmware update, process 1700 may involve apparatus 600 performing a number of operations. For instance, process 1700 may involve apparatus 600 determining whether a newer version of a firmware corresponding to operations of remote device 690 is available from first device 690 (or the other apparatus 695). Process 1700 may also involve apparatus 600 receiving the newer version of the firmware from remote device 690 (or the other apparatus 695) in response to a determination that the newer version of the firmware is available from remote device 690 (or the other apparatus 695). Moreover, process 1700 may involve apparatus 600 updating an existing version of the firmware with the newer version of the firmware received from remote device 690 (or the other apparatus 695). Additionally, in performing the firmware update, process 1700 may also involve apparatus 600 performing a number of operations. For instance, process 1700 may involve apparatus 600 receiving the newer version of the firmware from a remote source (e.g., a cloud-based server) in response to a determination that the newer version of the firmware is not available from remote device 690 (or the other apparatus 695). Furthermore, process 1700 may involve apparatus 600 updating an existing version of the firmware with the newer version of the firmware received from the remote source.

Alternatively or additionally, in performing the firmware update, process 1700 may involve apparatus 600 performing a number of operations. For instance, process 1700 may involve apparatus 600 determining whether a firmware corresponding to operations of remote device 690 already exists in apparatus 600. In response to a determination that the firmware corresponding to the operations of remote device 690 does not already exist in apparatus 600, process 1700 may involve apparatus 600 receiving a copy of the firmware, e.g., from remote device 690 (or the other apparatus 695) or a remote source such as a cloud-based server.

Alternatively or additionally, in performing the firmware update, process 1700 may involve apparatus 600 performing a number of operations. For instance, process 1700 may involve apparatus 600 determining whether an existing version of a firmware is sufficient for operations of remote device 690. Moreover, process 1700 may involve apparatus 600 performing the firmware update in response to a determination that the existing version of the firmware is not sufficient for the operations of remote device 690.

Figure 18:
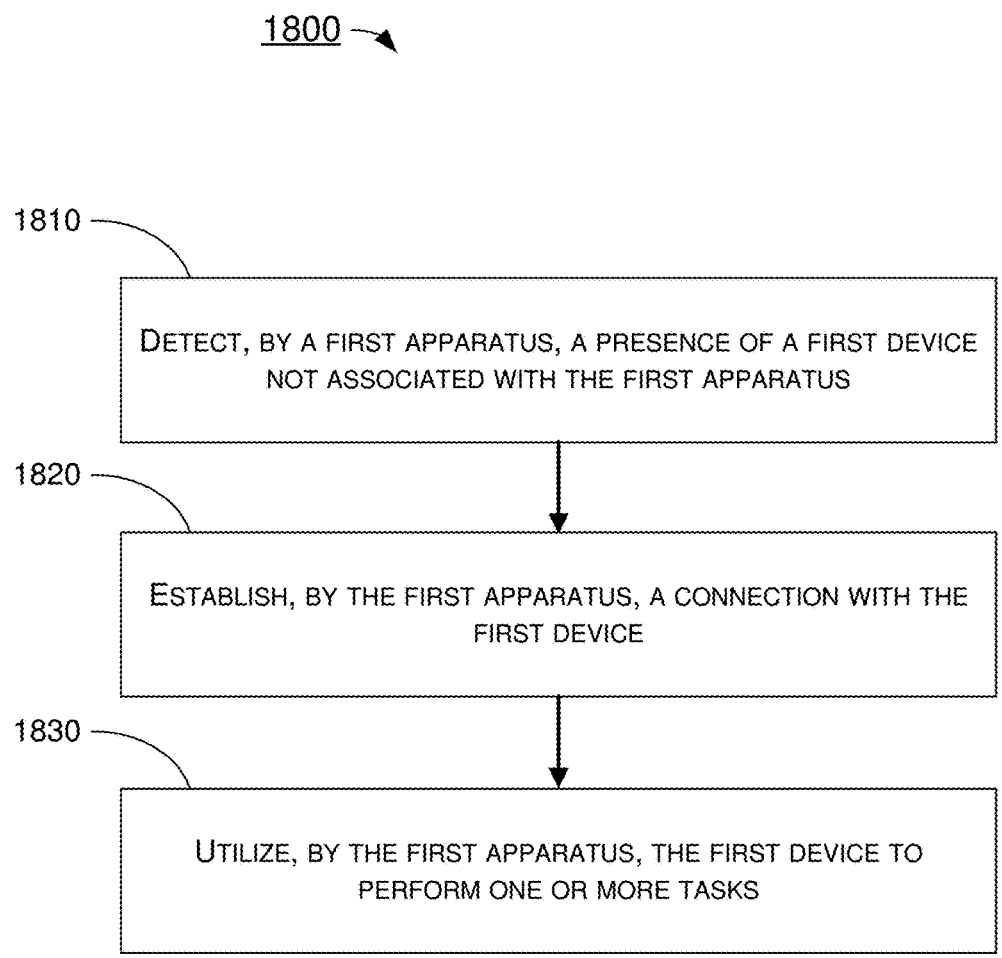
FIG. 18 is a flowchart of an example process in accordance with yet another implementation of the present disclosure.

FIG. 18 illustrates an example process 1800 in accordance with yet another implementation of the present disclosure. Process 1800 may include one or more operations, actions, or functions as represented by one or more blocks such as blocks 1810, 1820 and 1830. Although illustrated as discrete blocks, various blocks of process 1800 may be divided into additional blocks, combined into fewer blocks, or eliminated, depending on the desired implementation. The blocks may be performed in the order shown in FIG. 18 or in any other order, depending on the desired implementation. Process 1800 may be implemented by apparatus 110, apparatus 120, apparatus 210, apparatus 220, apparatus 600 and apparatus 700. Solely for illustrative purpose and without limiting the scope of the present disclosure, process 1800 is described below in the context of process 1800 being performed by apparatus 600. Process 1800 may begin at 1810.

At 1810, process 1800 may involve apparatus 600 detecting or otherwise discovering a presence of a remote device 690 not a part of apparatus 600. Remote device 690 may be associated with another apparatus 695 which is physically separate from apparatus 600. Process 1800 may proceed from 1810 to 1820.

At 1820, process 1800 may involve apparatus 600 establishing a communication connection with remote device 690. Process 1800 may proceed from 1820 to 1830.

At 1830, process 1800 may involve apparatus 600 utilizing remote device 690 to perform one or more tasks.

In some implementations, in detecting the presence of remote device 690, process 1800 may involve apparatus 600 receiving a wireless or wired signal indicative of the presence of remote device 690. For instance, apparatus 600 may receive a signal in compliance with the UPnP protocol indicative of the presence of remote device 690.

In some implementations, in establishing the connection with remote device 690, process 1800 may involve apparatus 600 modifying HAL 630 of an OS of apparatus 600. In some implementations, in modifying HAL 630 of the OS of apparatus 600, process 1800 may involve apparatus 600 storing, in memory 640 which is associated with HAL 630, a first path 642 pointing to remote device driver 670 which is associated with virtual device 680 corresponding to remote device 690. Additionally, process 1800 may involve apparatus 600 installing remote device driver 670 in an event that remote device driver 670 did not exist in apparatus 600.

In some implementations, process 1800 may further involve apparatus 600 performing a number of operations. For instance, process 1800 may involve apparatus 600 comparing one or more characteristics of remote device 690 to one or more characteristics of local device 660 which is associated with (e.g., installed on) apparatus 600. Moreover, process 1800 may involve apparatus 600 selecting remote device 690 to perform the one or more tasks as a result of the comparing. For instance, based on comparison of the one or more characteristics, apparatus 600 may determine that remote device 690 may achieve better result(s) than local device 660 in performing the one or more tasks and, thus, select remote device 690 over local device 660 to perform the one or more tasks.

In some implementations, in establishing the connection with remote device 690, process 1800 may involve apparatus 600 modifying HAL 630 of the OS of apparatus 600 by storing, in memory 640 which is associated with HAL 630, a first path 642 pointing to remote device driver 670 associated with virtual device 680 corresponding to remote device 690 in addition to a second path 644 pointing to local device driver 650 configured to drive local device 660. Additionally, process 1800 may involve apparatus 600 installing remote device driver 670 in an event that remote device driver 670 did not exist in apparatus 600.

In some implementations, in utilizing remote device 690 to perform the one or more tasks, process 1800 may involve apparatus 600 disabling local device driver 650 temporarily, e.g., at least for a period of time during which remote device 690 is utilized to perform the one or more tasks.

Alternatively, in establishing the connection with remote device 690, process 1800 may involve apparatus 600 modifying HAL 630 of the OS of apparatus 600 by replacing, in memory 640 which is associated with HAL 630, second path 644 pointing to local device driver 650 configured to drive local device 660 with a first path 642 pointing to remote device driver 670 associated with virtual device 680 corresponding to remote device 690. Additionally, process 1800 may involve apparatus 600 installing remote device driver 670 in an event that remote device driver 670 did not exist in apparatus 600.

In view of the above, an apparatus (e.g., apparatus 600 and/or apparatus 700) may include a connection module configured to detect a presence of a remote device and establish a communication connection with the remote device. The apparatus may also include a processing unit coupled to the connection module. The processing unit may be configured to utilize the remote device to perform one or more tasks.

In some implementations, the processing unit may be configured to modify a HAL of an OS executed by the processing unit in response to establishing the connection with the remote device. In some implementations, in modifying of the HAL of the OS, the processing unit may be configured to store, in a memory associated with the HAL, a first path pointing to a remote device driver associated with a virtual device corresponding to the remote device. In some implementations, the processing unit may be further configured to install the remote device driver.

In some implementations, the apparatus (e.g., apparatus 600) may also include a local device. The processing unit may be further configured to compare one or more characteristics of the remote device to one or more characteristics of the local device. The processing unit may be also configured to select the remote device to perform the one or more tasks as a result of the comparing.

In some implementations, the processing unit may be configured to modify a HAL of an OS executed by the processing unit in response to establishing the connection with the remote device. In some implementations, in modifying the HAL of the OS, the processing unit may be configured to store, in a memory associated with the HAL, a first path pointing to a remote device driver associated with a virtual device corresponding to the remote device in addition to a second path pointing to a local device driver configured to drive the local device. In some implementations, the processing unit may be further configured to install the remote device driver.

In some implementations, in utilizing the remote device to perform the one or more tasks, the processing unit may be configured to disable the local device driver at least for a period of time during which the remote device is utilized to perform the one or more tasks.

In some implementations, in modifying the HAL of the OS, the processing unit may be configured to replace, in a memory associated with the HAL, a second path pointing to a local device driver configured to drive the local device with a first path pointing to a remote device driver associated with a virtual device corresponding to the remote device. In some implementations, the processing unit may be further configured to install the remote device driver.

In some implementations, the processing unit may be configured to reconfigure either or both of the local device and the remote device.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    detecting, by a first apparatus, a presence of a first device not a part of the first apparatus;
    performing, by the first apparatus, an update in response to the detecting;
    establishing, by the first apparatus, a communication connection with the first device; and
    utilizing, by the first apparatus, the first device to perform one or more tasks;
    wherein the utilizing of the first device to perform the one or more tasks comprises:
        comparing one or more characteristics of the first device to one or more characteristics of a local device; and
        selecting the first device to perform the one or more tasks as a result of the comparing,
    wherein the establishing of the connection with the first device comprises modifying a hardware abstraction layer (HAL) of an operating system (OS) executed by the first apparatus in response to establishing the connection with the first device,
    wherein the modifying of the HAL of the OS comprises storing, in a memory associated with the HAL, a first path pointing to a first device driver associated with a virtual device corresponding to the first device in addition to a second path pointing to a local device driver configured to drive the local device, and wherein the utilizing of the first device to perform the one or more tasks further comprises disabling the local device driver at least for a period of time during which the first device is utilized to perform the one or more tasks.

2. The method of claim 1, wherein the performing of the update comprises updating an existing firmware or installing a new firmware to operate the first device.

3. The method of claim 1, wherein the performing of the update comprises updating an existing device driver or installing a new device driver to operate the first device.

4. The method of claim 1, wherein the performing of the update comprises updating an existing operating system (OS) or installing a new OS to operate the first device.

5. A method, comprising:
   detecting, by a first apparatus, a presence of a first device not a part of the first apparatus;
   performing, by the first apparatus, firmware update in response to the detecting;
   establishing, by the first apparatus, a communication connection with the first device;
   comparing, by the first apparatus, one or more characteristics of the first device to one or more characteristics of a local device;
   selecting, by the first apparatus, the first device to perform the one or more tasks as a result of the comparing; and
   disabling, by the first apparatus, a local device driver at least for a period of time during which the first device is utilized to perform the one or more tasks,
   wherein the establishing of the connection with the first device comprises modifying a hardware abstraction layer (HAL) of an operating system (OS) executed by the first apparatus in response to establishing the connection with the first device, and
   wherein the modifying of the HAL of the OS comprises storing, in a memory associated with the HAL, a first path pointing to a first device driver associated with a virtual device corresponding to the first device in addition to a second path pointing to the local device driver configured to drive the local device.

6. The method of claim 5, wherein the performing of the firmware update comprises:
   determining whether a newer version of a firmware corresponding to operations of the first device is available from the first device;
   receiving the newer version of the firmware from the first device in response to a determination that the newer version of the firmware is available from the first device; and
   updating an existing version of the firmware with the newer version of the firmware received from the first device.

7. The method of claim 6, wherein the performing of the firmware update further comprises:
   receiving the newer version of the firmware from a remote source in response to a determination that the newer version of the firmware is not available from the first device; and
   updating an existing version of the firmware with the newer version of the firmware received from the remote source.

8. The method of claim 5, wherein the performing of the firmware update comprises:
   determining whether a firmware corresponding to operations of the first device exists in the first apparatus; and
   receiving a copy of the firmware in response to a determination that the firmware corresponding to the operations of the first device does not exist in the first apparatus.

9. The method of claim 8, wherein the receiving of the copy of the firmware comprises receiving the copy of the firmware from the first device or a remote source.

10. The method of claim 5, wherein the performing of the firmware update comprises:
    determining whether an existing version of a firmware is sufficient for operations of the first device; and
    performing the firmware update in response to a determination that the existing version of the firmware is not sufficient for the operations of the first device.

11. The method of claim 5, further comprising:
    determining whether a hardware component of the first apparatus or the first device needs to be reconfigured; and
    reconfiguring the hardware component in response to a determination that the hardware component needs to be reconfigured.

12. The method of claim 5, wherein the first device is associated with a second apparatus which is physically separate from the first apparatus.

13. An apparatus, comprising:
    a connection circuit that detects a presence of a remote device and establishes a communication connection with the remote device;
    a processing circuit coupled to the connection circuit, the processing circuit capable of utilizing the remote device to perform one or more tasks; and
    a local device,
    wherein the processing circuit further performs operations comprising:
       comparing one or more characteristics of the remote device to one or more characteristics of the local device; and
       selecting the remote device to perform the one or more tasks as a result of the comparing,
    wherein the processing circuit modifies a hardware abstraction layer (HAL) of an operating system (OS) executed by the processing unit in response to establishing the connection with the remote device,
    wherein, in modifying the HAL of the OS, the processing circuit stores, in a memory associated with the HAL, a first path pointing to a remote device driver associated with a virtual device corresponding to the remote device in addition to a second path pointing to the local device driver configured to drive the local device, and
    wherein, in utilizing the remote device to perform the one or more tasks, the processing unit is configured to disable the local device driver at least for a period of time during which the remote device is utilized to perform the one or more tasks.

14. The apparatus of claim 13, wherein the processing circuit further installs the remote device driver.

15. The apparatus of claim 13, wherein, in modifying the HAL of the OS, the processing circuit replaces, in a memory associated with the HAL, a second path pointing to the local device driver configured to drive the local device with a first path pointing to a remote device driver associated with a virtual device corresponding to the remote device.

16. The apparatus of claim 15, wherein the processing circuit further installs the remote device driver.

17. The apparatus of claim 13, wherein the processing circuit reconfigures either or both of the local device and the remote device.

\* \* \* \* \*